(12) United States Patent  
Smith et al.

(10) Patent No.: US 10,984,478 B2  
(45) Date of Patent: Apr. 20, 2021

(54) SYSTEM AND METHOD FOR OPTIMIZING ANNUITY PRODUCT COMPOSITION AND PRICING

(71) Applicant: Optimus Structures LLC, Carson City, NV (US)

(72) Inventors: Olga Smith, San Diego, CA (US); Jack Zeineh, Newport Beach, CA (US); Terry Nolan Taylor, Austin, TX (US); William L. Davenport, Austin, TX (US)

(73) Assignee: Optimus Structures LLC, Carson City, NV (US)

( * ) Notice: Subject to any disclaimer, the term of this patent is extended or adjusted under 35 U.S.C. 154(b) by 166 days.

(21) Appl. No.: 14/991,856

(22) Filed: Jan. 8, 2016

(65) Prior Publication Data

US 2016/0292790 A1    Oct. 6, 2016

Related U.S. Application Data

(60) Provisional application No. 62/101,831, filed on Jan. 9, 2015.

(51) Int. Cl.  
*G06Q 40/08* (2012.01)

(52) U.S. Cl.  
CPC .................. *G06Q 40/08* (2013.01)

(58) Field of Classification Search  
CPC ........................................ G06Q 40/08  
USPC ........................................... 705/4  
See application file for complete search history.

(56) References Cited

U.S. PATENT DOCUMENTS

| | | | | |
|---|---|---|---|---|
| 7,805,352 B2 * | 9/2010 | Mercier | ................ | G06Q 40/00 705/35 |
| 7,840,469 B2 * | 11/2010 | Mercier | ................ | G06Q 40/00 705/35 |
| 7,979,337 B2 * | 7/2011 | Mercier | ................ | G06Q 40/00 705/35 |
| 8,112,346 B2 * | 2/2012 | Mercier | ................ | G06Q 40/00 705/35 |
| 8,131,622 B2 * | 3/2012 | Mercier | ................ | G06Q 40/00 705/35 |
| 2008/0301035 A1 * | 12/2008 | Mercier | ................ | G06Q 40/00 705/37 |
| 2016/0260174 A1 * | 9/2016 | Singh | .................... | G06Q 40/06 |

* cited by examiner

*Primary Examiner* — Lindsay M Maguire  
(74) *Attorney, Agent, or Firm* — Mintz Levin Cohn Ferris Glovsky and Popeo, P.C.

(57) ABSTRACT

A system and method that allows a user to interactively and iteratively create, manage, customize and price optimized annuity product composition is described.

19 Claims, 23 Drawing Sheets

▽ Client Information

| Title | Last Name | First Name | Date of Birth | Sex | Life Expectancy | Current Age |
|---|---|---|---|---|---|---|
| Mr. | John | Doe | 01/12/2011 | male | 33 | 3 |

▽ LCP Information

| | |
|---|---|
| LCP Age | 3 |
| LCP Date | 01/09/2014 |
| Duration of Care | 30 |
| Value Expressed in LCP | $11,342,923.29 |
| Future Value of LCP | $18,873,740.64 |
| Future Value of Selected Structure | $18,873,740.64 |
| Future Value of Selected Structure/ Future Value of LCP | 100.00% |
| Begin of Life-Contingent Benefits | 10/01/2043 |
| Suggested Anticipated Life-Contingent Benefits (per year) | $921,860.87 |
| First Payment | 10/01/2015 |
| FV Typo | Optimus FV ▽ |

▽ Life-Contingent Settings

| Life-Contingent Benefits | Mode |
|---|---|
| ⊙Yes ○No | ⊙Automatic ○Manual |

*FIG. 1*

| Select Guarenteed Benefits | | ⦿ Automatic ◯ Manual | |
| --- | --- | --- | --- |
| Collapse All \| Expand All | | % | |
| + ☑ Physician Care | Beginning Age | 100 % | add |
| + ☑ Routine Diagnostics | Beginning Age | 100 % | add |
| - ☑ Medications | Beginning Age | 100 % | add |
| + ☑ Laboratory Studies | Beginning Age | 100 % | add |
| + ☑ Rehabilitation Services | Beginning Age | 100 % | add |
| + ☑ Equipment & Supplies | Beginning Age | 100 % | add |
| + ☑ Environmental Modifications & Essential Services | | | |
| + ☑ Nursing & Attendant Care | Beginning Age | 100 % | add |
| + ☑ Acute Care Services | Beginning Age | 100 % | add |

| ▽ Select Guarenteed Benefits | | ⦿Automatic ○Manual | |
|---|---|---|---|
| Collapse All \| Expand All | Beginning Age | % | |
| - ☑ Physician Care | | | |
| + ☑ Other M.D. | Beginning Age | 100 % | add |
| ☑ Physical Medicine and Rehabilitation (2.90%) | | 100 % | add |
| unit cost: $169.75; Begining age: 3; Frequency: 2 times per 1 year; Duratrion: 30 years; | | | |
| ☑ Pediatrician (2.90%) | | 100 % | |
| Unit cost: $129.33; Begining age: 3; Frequency: 2 times per 1 year; Duration: 15 years | | | |
| ☑ Developmental Specialist (2.90%) | | 100 % | |
| Unit cost: $130.00; Begining age: 3; Frequency: 1 times per 1 year; Duration: 10 years | | | |
| ☑ Obolaryngologist (2.90%) | | 100 % | |
| Unit cost: $161.67; Begining age: 3; Frequency: 1 times per 1 year; Duration: 30 years | | | |
| ☑ Primary Care Physician (2.90%) | | 100 % | |
| Unit cost: $131.67; Begining age: 3; Frequency: 2 times per 1 year; Duration: 15 years | | | |
| ☑ Pediatric Neurologist (2.90%) | | 100 % | |
| Unit cost: $101.67; Begining age: 3; Frequency: 3 times per 1 year; Duration: 30 years | | | |
| ☑ Ophthalmologist (2.90%0 | | 100 % | |
| Unit cost: $160.00; Begining age: 3; Frequency: 1 times per 1 year; Duration: 30 years | | | |
| ☑ Gastroenterologist (2.90%) | | 100 % | |
| Unit cost: $125.00; Begining age: 3; Frequency: 1 times per 1 year; Duration: 30 years | | | |
| ☑ Dentist (2.90%) | | 100 % | |
| Unit cost: $107.17; Begining age: 3; Frequency: 1 times per 1 year; Duration: 30 years | | | |
| + ☑ Routine Diagnostics | Beginning Age | 100 % | add |
| - ☑ Medications | Beginning Age | 100 % | add |
| + ☑ Laboratory Studies | Beginning Age | 100 % | add |
| + ☑ Rehabilitation Services | Beginning Age | 100 % | add |
| + ☑ Equipment & Supplies | Beginning Age | 100 % | add |
| + ☑ Environmental Modifications & Essential Services | Beginning Age | 100 % | add |
| + ☑ Nursing & Attendant Care | Beginning Age | 100 % | add |
| + ☑ Acute Care Services | Beginning Age | 100 % | add |

▽ Select Guarenteed Benefits                                ⦿Automatic ○Manual

Collapse All | Expand All                    %        add

+ ☑ Physician Care                   Name  [_____]    ┌─────────┐
                                                          │ None    │
+ ☑ Routine Diagnostics              Description          │ Equipment│
                                     ┌──────────┐         │ Medicine │
+ ☑ Medications                      │          │         │ Service  │
                                     │          │         └─────────┘
+ ☑ Laboratory Studies               └──────────┘
                                                    Beginning Age  100  %  add
+ ☑ Rehabilitation Services          [ Save ]
                                                    Beginning Age  100  %  add
+ ☑ Equipment & Supplies + ☑ Environmental Modifications & Essential Services
                                                    Beginning Age  100  %  add
+ ☑ Nursing & Attendant Care
                                                    Beginning Age  100  %  add
+ ☑ Acute Care Services

▽ Select Guarenteed Benefits | ● Automatic ○ Manual
Collapse All | Expand All
- ☑ Physician Care
  - ☑ Other M.D.

| | Beginning Age | % | |
|---|---|---|---|
| | | | add |

Name: Neuropsychologist
Inflation: 4.00   Unit Cost: 600   Age: 25   ☐ one time
Frequency: 1 times per 1 Month ▽   Duration: 50 ▽
Save   Delete                                                       add ☑ Endocrinologist, Neurosurgeion, Urologist, Pulmonolist, Orthopedic St (2.90%)
Unit cost: $169.75; Begining age: 3; Frequency: 1 times per 1 year; Duration: 30 years ☑ Physical Medicine and Rehabilitation (2.90%)
Unit cost: $129.33; Begining age: 3; Frequency: 2 times per 1 year; Duration: 15 years ☑ Pediatrician (2.90%)
Unit cost: $129.33; Begining age: 3; Frequency: 2 times per 1 year; Duration: 15 years ☑ Developmental Specialist (2.90%)
Unit cost: $130.00; Begining age: 3; Frequency: 1 times per 1 year; Duration: 10 years ☑ Otolaryngologist (2.90%)                                           100 %   add
Unit cost: $101.67; Begining age: 3; Frequency: 2 times per 1 year; Duration: 30 years ☑ Primary Care Physician (2.90%)                                     100 %   add
Unit cost: $131.67; Begining age: 3; Frequency: 3 times per 1 year; Duration: 15 years ☑ Pediatric Neurologist (2.90%)                                      100 %   add
Unit cost: $160.00; Begining age: 3; Frequency: 3 times per 1 year; Duration: 30 years ☑ Ophtbalmologist (2.90%)                                            100 %   add
Unit cost: $100.00; Begining age: 3; Frequency: 1 times per 1 year; Duration: 30 years ☑ Gastroeterologist (2.90%)                                          100 %   add
Unit cost: $125.00; Begining age: 3; Frequency: 1 times per 1 year; Duration: 30 years ☑ Dentist (2.90%)                                                    100 %   add
Unit cost: $107.17; Begining age: 3; Frequency: 1 times per 1 year; Duration: 30 years ☑ Botox Injection (2.90%)                                            100 %   add
Unit cost: $599.00; Begining age: 3; Frequency: 2 times per 1 year; Duration: 3 years

| ▽ Insurers to include in quote | | | | |
|---|---|---|---|---|
| ☑ Liberty Life | A | Add rated age (if provided) | Premium Allocation ($) | Premium Allocation (%) |
| ☑ Netlife | A+ | Add rated age (if provided) | Premium Allocation ($) | Premium Allocation (%) |
| ☑ New York Life | A++ | Add rated age (if provided) | Premium Allocation ($) | Premium Allocation (%) |
| ☑ Pacific Life | A++ | Add rated age (if provided) | Premium Allocation ($) | Premium Allocation (%) |
| ☑ Prudential | A+ | Add rated age (if provided) | Premium Allocation ($) | Premium Allocation (%) |

FIG. 10

| ▽ Client Information | | | | | | | | | |
|---|---|---|---|---|---|---|---|---|---|
| Title | Last Name | First Name | Date of Birth | First Payment | LCP Age | Current Age | Sex | Life Expectancy | Duration of Care | FV Type |
| Mr. | John | Doe | | 10/01/2015 | 3 | 3 | Male | 33 | 30 | Optimus FV |

FIG. 13

| ▽ Optimus Analyzer | | | |
|---|---|---|---|
| Optimus Annuity Type | Select | Select Plus | Standard |
| Life LCP Plan Overview | | | |
| Value Expressed in LCP | $11,347,923.29 | $11,342,923.29 | $11,347,923.29 |
| Future Value of LCP | $18,873,740.64 | $18,873,740.64 | $18,873,740.64 |
| Guaranteed Benefits | | | |
| Guaranteed Benefits | $16,899,242.95 | $16,892,242.59 | $16,899,242.63 |
| Unstructured Future Expenses | $838,469.48 | $838,469.48 | $838,469.48 |
| Premium for Guaranteed Benefits | $10,171,788.39 | $10,154,063.52 | $10,268,336.30 |
| Payout Ratio on Guaranteed Benefits | $1.66 | $1.66 | $1.65 |
| IRR on Guaranteed Benefits | 3.55% | 3.57% | 3.48% |
| Life-Contigent Benefits | | | |
| Begin of Life-Contingent Benefits | 10/01/2042 | 10/01/2042 | 10/01/2042 |
| Anticipated Life-Contingent Benefits (total) | $912,860.88 | $912,860.88 | $912,860.88 |
| Anticipated Life-Contingent Benefits (per year) | $912,860.88 | $912,860.88 | $912,860.88 |
| Premium for Life-Contingent Benefits | $11,398,683.08 | $11,398,683.08 | $11,398,683.08 |
| Payout Ratio on Anticipated Benefits | $0.08 | $0.08 | $0.08 |
| Anticipated IRR on Life-Contigent Benefits | 0.00% | 0.00% | 0.00% |

| Combined Benefits | | | |
|---|---|---|---|
| Total Benefits | $17,812,103.83 | $17,812,103.47 | $17,812,103.51 |
| Total Premium | $21,570,471.47 | $21,552,746.00 | $21,667,019.38 |
| Return per Dollar of Premium for Total Benefits | $0.83 | $0.83 | $0.82 |
| IRR on Total Benefits | 0.00% | 0.00% | 0.00% |
| Quote | | | |
| Quote (step 1) | Generate | Generate | Generate |
| QIB | Generate | Generate | Generate |
| Rates | Go To Rates | Go To Rates | Go To Rates |

FIG. 14

▽ Select Plus Rate

| First Pay | Type | Frequency | Period | Benefit Amount | Total Benefit Amount | Liberty Life | Met Life | New York Life | Pacific Life | Prudential |
|---|---|---|---|---|---|---|---|---|---|---|
| 01/01/2016 | LumpSum | N/A | N/A | $205,985.56 | $205,985.56 | $213,195.05 | $215,856.38 | $217,156.15 | $213,195.05 | $211,433.87 |
| 07/01/2016 | LumpSum | N/A | N/A | $206,463.07 | $206,463.07 | $211,831.93 | $214,361.11 | $216,547.56 | $212,038.39 | $210,017.11 |
| 01/01/2017 | LumpSum | N/A | N/A | $211,690.07 | $211,690.07 | $215,077.11 | $217,386.64 | $220,398.99 | $215,288.80 | $213,178.25 |
| 07/01/2017 | LumpSum | N/A | N/A | $213,417.04 | $213,417.84 | $214,484.12 | $216,381.40 | $220,067.11 | $214,910.95 | $212,661.54 |
| 01/01/2018 | LumpSum | N/A | N/A | $219,544.91 | $219,544.91 | $218,008.09 | $219,274.86 | $223,722.84 | $218,008.09 | $215,950.95 |
| 07/01/2018 | LumpSum | N/A | N/A | $220,921.60 | $220,921.00 | $216,281.73 | $216,845.08 | $221,970.45 | $215,618.97 | $213,869.27 |
| 10/01/2018 | PeriodCertain | Monthly | 1 | $42,121.25 | $505,456.20 | $481,826.12 | $485,824.70 | $492,061.61 | $474,160.03 | $477,555.86 |
| 10/01/2019 | PeriodCertain | Monthly | 1 | $39,347.36 | $472,168.32 | $435,535.92 | $434,115.48 | $444,389.08 | $426,643.42 | $429,587.78 |
| 02/01/2021 | LumpSum | N/A | N/A | $242,361.30 | $242,361.10 | $217,882.62 | $211,680.60 | $221,493.80 | $212,793.04 | $212,623.39 |
| 07/01/2021 | LumpSum | N/A | N/A | $243,531.49 | $243,531.49 | $215,525.36 | $207,946.66 | $218,664.48 | $209,924.14 | $209,804.81 |
| 01/01/2022 | LumpSum | N/A | N/A | $250,000.84 | $250,008.84 | $216,257.64 | $208,394.86 | $219,472.76 | $210,757.45 | $210,764.95 |
| 07/01/2022 | LumpSum | N/A | N/A | $251,280.44 | $251,280.44 | $211,829.41 | $205,125.24 | $215,352.36 | $207,557.64 | $207,341.54 |

| ▽ Optimus Advantage (individual carriers) | | | | | | |
|---|---|---|---|---|---|---|
| | Pacific Life A++ | Liberty Life A | New York Life A++ | Met Life A+ | Prudential A+ | Optimus |
| A.M. Best Rating | | | | | | |
| Guaranteed Benefits | $3,659,783.59 | $3,659,783.59 | $3,659,783.59 | $3,659,783.59 | $3,659,783.59 | $3,659,783.73 |
| Premium for Guaranteed Benefits | $1,963,125.53 | $1,824,308.60 | $1,934,739.15 | $1,912,183.78 | $1,819,097.63 | $1,821,265.26 |
| Payout Ratio | $1.86 | $2.01 | $1.89 | $1.91 | $2.01 | $2.01 |
| Internal Rate of Return | 3.25% | 3.68% | 3.34% | 3.40% | 3.69% | 3.68% |
| Optimus Savings ($) | $141,860.27 | $3,043.34 | $113,473.89 | $90,918.52 | ($2,167.63) | |
| Optimus Savings (%) | 7.23% | 0.17% | 5.87% | 4.75% | -0.12% | |
| Optimus Savings For MMP | $72,262.45 | $1,668.22 | $58,650.74 | $47,546.96 | ($1,191.60) | |
| Anticipated Benefits | $1,053,735.55 | $1,053,735.55 | $1,053,735.55 | $1,053,735.55 | $1,053,735.55 | $1,053,735.55 |
| Premium for Anticipated Benefits | $726,354.05 | $429,291.59 | $427,624.93 | $458,038.67 | $619,811.77 | $427,624.93 |
| Payout Ratio | $1.45 | $2.45 | $2.46 | $2.30 | $1.70 | $2.46 |
| Internal Rate of Return | 1.08% | 2.63% | 2.65% | 2.44% | 1.55% | 2.65% |
| Optimus Savings ($) | $298,729.12 | $1,666.66 | $0.00 | $30,413.74 | $192,186.64 | |
| Optimus Savings (%) | 41.13% | 0.39% | 0.00% | 6.64% | 31.0% | |
| Optimus Savings For MMP | $411,272.05 | $3,882.35 | $0.00 | $66,399.94 | $310,072.91 | |
| Total Benefits | $4,713,519.14 | $4,713,519.14 | $4,713,519.14 | $4,713,519.14 | $4,713,519.14 | $4,713,519.28 |
| Total Premium | $2,689,479.58 | $2,253,600.19 | $2,362,364.00 | $2,370,222.45 | $2,438,909.40 | $2,248,890.19 |
| Payout Ratio | $1.75 | $2.09 | $2.00 | $1.99 | $1.93 | $2.10 |
| Internal Rate of Return | 2.51% | 3.38% | 3.15% | 3.13% | 2.99% | 3.39% |
| Optimus Savings ($) | $440,589.39 | $4,710.00 | $113,473.89 | $121,332.26 | $190,019.21 | |
| Optimus Savings (%) | 16.38% | 0.21% | 4.80% | 5.12% | 7.79% | |
| Optimus Savings For MMP | $163,819.57 | $2,089.99 | $48,034.04 | $51,190.24 | $77,911.55 | |

| ▽ Individual Companies Benefits Diversification | | | | | ☑ Include Life |
|---|---|---|---|---|---|
| | Pacific Life | Liberty Life | New York Life | MetLife | Prudential |
| Allocated Premium | $1,963,125.53 | $1,824,308.60 | $1,934,739.15 | $1,912,183.78 | $1,819,097.63 |
| | 20.00% | 20.00% | 20.00% | 20.00% | 20.00% |
| | $392,625.11 | $364,861.72 | $386,947.83 | $382,436.76 | $363,819.53 |
| Life Premium | | | $427,624.93 | | |
| | | | | | |
| | | | | Total Premium | $2,318,315.87 |
| | | | | Optimus Premium | $2,248,890.19 |
| | | | | Optimus Savings ($) | $69,425.68 |
| | | | | Optimus Savings (%) | 2.99% |

*FIG. 21*

$$T_{xy} = \frac{\sum_{i=1}^{n}(x_i - \bar{x})(y_i - \bar{y})}{(n-1)s_x s_y} = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}}$$

SYSTEM AND METHOD FOR OPTIMIZING ANNUITY PRODUCT COMPOSITION AND PRICING

CROSS-REFERENCES TO RELATED APPLICATIONS

This application claims priority from U.S. Application No. 62/101,831, filed Jan. 9, 2015, which is incorporated herein in its entirety.

BACKGROUND

The present invention relates generally to the field of personal injury, and more particularly to the customization, creation, management and optimization structured settlement annuity products which address medical and/or economic damages specified in Life Care Plans, Medicare Set Asides, and Loss of Earnings Assessments.

A structured settlement is a financial or insurance arrangement whereby a claimant agrees to resolve a personal injury tort claim by receiving periodic payments on an agreed schedule rather than as a lump sum. Structured settlements were first utilized in Canada after a settlement for children affected by Thalidomide. Structured settlements are widely used in product liability or injury cases (such as the birth defects from Thalidomide). Structured settlement cases became more popular in the United States during the 1970s as an alternative to lump sum settlements. The increased popularity was due to several rulings by the IRS, an increase in personal injury awards, and higher interest rates. The IRS rulings changed policies such that if certain requirements were met then claimants could have federal income tax waived. Higher interest rates result in lower present values, hence annuity premiums for deferred payments versus a lump sum.

Structured settlements have become part of the statutory tort law of several common law countries including Australia, Canada, England and the United States. Often the periodic payments will be created through the purchase of one or more annuities, which guarantee the future payments. Structured settlement payments are sometimes called periodic payments, and when incorporated into a the settlement of a law suit, is called a "periodic payment."

Congress adopted special tax rules in Public Law 97-473, the periodic Payment Settlement Tax Act of 1982 to encourage the use of structured settlements to provide long-term financial security to seriously injured victims and their families. These structured settlement rules, as codified in sections 104(a)(2) and 130 of the Internal Revenue Code of 1986, 26 U.S.C. 104(a)(2) and 130, have been in place working effectively since then. In the Taxpayer Relief Act of 1997, Congress extended the structured settlements to worker's compensation to cover physical injuries suffered in the workplace. A "structured settlement" under the tax code's terms is an "arrangement" that meets the following requirements:

The structured settlement tax rules enacted by Congress lay down a bright line path for a structured settlement. Once the plaintiff and defense have settled the tort claim in exchange for periodic payments to be made by the defendant, the full amount of the periodic payments constitutes tax-free damages to the victim. The defendant then may assign its periodic payment obligation to a structured settlement assignment company that funds its assumed obligation with an annuity purchased from a life insurer or via U.S. Treasury obligations.

Currently, annuity products offered by life insurers are available in a variety of forms, and include, but are not limited to, the following examples:

Period Certain: with a period certain instrument, a fixed amount of money is paid out monthly (or in other intervals, or "time slices") for a fixed period of time (duration), such as 20 years. At the end of the fixed period of time, payments end.

Lump Sum: with a lump sum instrument (also called an endowment), a fixed payment is made only once at a predefined time (e.g. 7 years).

Life Only: with a life only instrument, a fixed amount of money is paid out monthly (or in other specified intervals) until the insured passes away. A variation of life only, life with a period certain option, pays a fixed amount of money on a fixed basis (e.g. monthly, quarterly, semi-annually, annually) for a fixed duration (e.g. 20 years) to either the insured or their designated heirs. After the fixed period, the instrument only pays while the insured is alive.

Life Only, Joint and Survivor: with a life only, joint and survivor instrument, the insureds are paid a fixed amount of money monthly (or in other intervals) until both of the insureds pass away. I a certain period is selected then their designated heir is paid a predetermined percentage of the original payment until the certain period is satisfied.

The price of the 7 year instrument in the preceding example reflects a combination of short term and longer terms yields that the originating insurer desires. Each insurer, however, can often have material differences in the yield (cost) curves they use internally to construct their period certain instrument. These yields, at given points in time, and over time, are reflected in the costs of the various types of instruments they offer to consumers. What is needed is a system that enables the insured (or the insured's broker) to identify, select and capture beneficial differences between these yield (cost) curves, at different periods in time, or across a continuum of time, for different intervals, and from different insurers, and in doing so, increase value to the consumer.

Additionally, when a broker creates a structured annuity to address a plaintiff's future medical requirements or lost income, he or she does so today in generalized, approximated fashion. For example if a Life Care Plan ("LCP") calls for $5MM of medical care over a 20 year period, it would be customary for a broker today to structure an annuity in the following manner: $250IC per year, increasing at a 3% COLA each year, for 20 years. While generally acceptable, such non-specific approaches leave much to be to be desired. In addition to being able to identify and beneficially select and capture differences between individual insurers' yield (cost) curves over time, a systems is also needed to enable consumers (and brokers) to structure damages which are specified in damages valuation models, such as Life Care Plans, Medicare Set Asides and Loss of Earnings Assessments, with increased specificity and control, as increasing the specificity of a structured annuity can also increase its value to the consumer in the form of additional reductions in cost to the consumer, reduced exposure to potential financial shortfalls as a result of not structuring irregular, yet anticipated financial requirements included in such damages valuation models, and the like.

Life Care Plans objectively identify the residual medical conditions and ongoing care requirements of ill/injured individuals, and they quantify the ongoing costs of supplying these individuals with requisite medically-related goods and services throughout their durations of care.

Life Care Plans answer three Basic Questions about individuals who are ill or injured: 1) what's wrong with the person (i.e. what are their diagnostic conclusions, impairments and disabilities), 2) what do they need to take care of them (i.e. what are their medical requirements), and 3) how much will the requirements cost over time?

Medicare Set Asides (MSAs), also known as Worker's Compensation Medicare Set-Aside Arrangement (WC-MAS), are structured in the same fashion as Life Care Plans but address a different goal. They are financial agreements that allocates a portion of a workers' compensation settlement to pay for future medical services related to the workers' compensation injury, illness, or disease. Like a Life Care Plan, they specify goods and services that are needed in a person's care, but unlike a Life Care Plan, are restricted to those sets of goods and services that would be allowably reimbursed under Medicare. These funds must be depleted before Medicare will pay for treatment related to the workers' compensation injury, illness, or disease.

It is common for plaintiff's who are ill/injured to structure their awards to cover the anticipated medical expenses identified in Life Care Plans or Medicare Set-Asides, as structuring damages to meet future medical requirements reduces the risk of the plaintiff mismanaging their money, and thereby not having it to meet the medical necessities specified in Life Care Plans.

Loss of Earnings Assessments (also referred to as vocational assessments, loss of earnings capacity assessments, economic damages assessments, etc.) determine economic damages resulting from a person's loss of earnings and/or loss of earnings capacity, resulting from a chronic and/or catastrophic injury or illness.

It is common for plaintiffs who are ill/injured to structure their award to cover lost income (past and/or future), as structuring damages to replace lost income reduces the likelihood a plaintiff mismanaging/prematurely spending/losing their money, and thereby becoming financially destitute with no capacity to earn a living.

In the current art, the settlement broker goes thru a subjective process of discussing needs with guidance from the Life Care Plan. The Life Care Plan is too detailed to feasibly use for granular analysis. As such the structured settlement broker and the client work together to determine how much of the plan to structure and how much not to structure, and then review at a coarse level to determine the sufficiency of the structured payments compared to the Life Care Plan. Thus, the current method of creating a structured settlement is done using trial and error with pen or pencil, or by using electronic spreadsheets. Optimization of such a plan is tedious and requires repeated calculations.

Currently, there is no system that allows the user to selectively add/edit/delete every element of the life care plan. What is needed is a system and method that allows the paradigm to change such that the Life Care Plan can be used for precise and not subjective structure planning. This precision allows new processes such as category by category exclusion, start date adjustment, and category percentage adjustment to be elemental steps in the process.

Furthermore, using prior art methods, once the desired amounts to be structured are determined, the selection of structured products to flesh out the plan is based primarily on simplicity rather than optimal pricing. Even when the broker and the client have created a coarse level year by year payment schedule, selecting the combination of structured products that will produce that revenue stream can be very complex. This complexity of matching structure settlement products to desired revenue stream often precludes trying to figure out which insurer or combination of insurers would provide the best pricing for that revenue stream. Therefore the process results in both suboptimal payment timing as well as suboptimal pricing.

Consequently, once desired payout amounts are selected there is no way for broker to efficiently leverage selection of available products, nor is there a framework or process that defines optimization conditions to match the payouts to the Life Care Plan. For example, there is no way for the user to instruct prior art systems to optimize for pricing at the expense of precision of payment match to Life Care Plan at a predetermined level of precision such as 1 year. Similarly, there is no way for the user to say that the system should precisely match to the life care plan and optimize pricing within those constraints.

Thus, the prior systems and methods are subjective and lack defined optimization conditions as well as inherently losing precision during the creation of the structured settlement due to the need to reduce complexity.

What has been needed, and heretofore unavailable is a system and method that can handle the complexity and allow it to be leveraged for fine grained and interactive Life Care Plan editing, structured settlement payment timing compared to needs, optimization parameterization, and automated selection of structured settlement products to satisfy the optimization parameters. The present invention satisfies these, and other needs.

SUMMARY OF THE INVENTION

In its most general aspect, the invention includes a system and method for interactively and iteratively managing and manipulating information to create, customize, manage, quote and optimize a structured settlement annuity ("structured settlement") composition and pricing. The system is comprised of an application server that maintains, or that has access to, a plurality of Life Care Plans, Medicare Set-Asides, Loss of Earnings Assessments, and/or other types of damages models, for a plurality individuals, and quotes for a plurality of financial products, as well as customized structured settlement quotes and constructions. The application server also maintains algorithms for constructing structured settlement quoting options, and ultimately, the quote itself. The application server is accessible locally, or remotely across a network. A user of the system may manually enter the information contained in a Life Care Plan or Medicare Set-Aside, or select a Life Care Plan or Medicare Set-Aside created for an individual. The Life Care Plan or Medicare Set-Aside is analyzed by the system in order to create a projection of costs for different components of the Life Care Plan or Medicare Set-Aside at given points in time. These points in time may be configured to be user definable lengths (intervals or 'time slices'); the user may add or delete items from the Life Care Plan or Medicare Set-Aside that contribute to the cost model at any or all time slices. The user may also specify what portion of a given Life Care Plan's or Medicare Set-Asides' elements, cost categories, or specific items to consider. Furthermore, the user may specify upper boundaries/limits of total cost within each time slice.

The resulting modified cost projection is then used directly to specify a customized of series of cash flows for the structured settlement product. The intent is to customize structured settlement annuities that directly match a Life Care Plan or Medicare Set-Aside, or the desired portions of the Life Care Plan's or Medicare Set-Asides' cost projections the user has affirmatively identified in the system, and which they desire to structure. The system displays to the user this specific cost projection, along with a constituent Life Care Plan's, or a Medicare Set-Asides' components.

The user is then able to instruct the application server to automatically search all available financial products (or a subset of those products), and automatically select the composition of products that will most beneficially satisfy the specified cash flow requirements. The user may also perform a search with additional parameters, such as slackening allowance. This setting allows the system to not be required to precisely match the specified and/or modified Life Care Plan's or Medicare Set Aside's cost projections in order to optimize cost. In such cases, the system may additionally search based upon an identified minimum financial product rating and/or provider rating (for example, A. M. Best, Moody's, Standard & Poor's rating, and the like).

The system presents the user quotes of optimal product composition generated with each setting, allowing the user to then select a specific quote of interest/greatest value.

In another aspect, the present invention includes a system for creating, managing, and quoting structured settlement products comprising: a server in communication with a memory, the memory for storing information related to a plurality of Life Care Plans, Medicare Set Asides, Loss Of Earnings Assessments, and/or other types of damages model, quotes for financial products and customized structured settlement quotes and constructions, the server having a processor and electrical circuitry configured to operate under the control of programming commands provided by software programs, the server also having a communication bus configured to communicate with other processors over a network; a client device having a processor and electrical circuitry configured to operate under the control of programming commands provided by software programs, the client device also having a communication bus configured to communicate with other processors over the network, the client device also having an input device and an output device; wherein the client device is configured to communicate the processor of the server to access a software application configured to accept information input by a user of the client device, the information including information related to a particular person for whom a structured settlement product is being quoted, information related to a selected future value calculation method, information related to a selected duration of care, information related to the inclusion of life-contingent benefits, including a start date for delivery of the life-contingent benefits, and information related to a source location of a Life Care Plan or Medicare Set Asides; wherein the processor of the server receives the information communicated by the device client and is programmed to utilize the received information to generate a structured settlement plan and to communicate the generated structured settlement plan to the client device; and wherein the processor of the client device is programmed to output the generated structured settlement plan to a user of the client device through the output device of the client device.

In yet another aspect, the processor of the client device communicates with the processor of server to retrieve information related to available Life Care Plan or Medicare Set Aside category and display the available Life Care Plan or Medicare Set Aside category to a user of the client device.

In still another aspect, wherein the information related to available Life Care Plan or Medicare Set Aside category includes services within each category. In another aspect, the generated structured settlement plan includes total Life Care Plan costs for a predetermined time interval. In yet another aspect, the generated structured settlement plan includes constituent costs for each time interval. In still another aspect, the time interval may be changed by the user to display updated total Life Care Plan costs.

In another aspect, the present invention includes a method for creating customized structured settlements, comprising: receiving a list of desired cash payments; receiving a list including the identity of at least one insurer; summing the desired payments to select the lowest cost lump sum structured annuity for each desired cash payment; and selecting the lowest cost combination of period certain structured annuities to satisfy the desired cash payments.

In still another aspect, the present invention includes a system wherein the server processor is configured by programming commands to generate the structured settlement plan by retrieving information related to available insurers, generating at least one combination of coverage information retrieved from the available insurers that provides a benefit that meets a payment need for a selected interval, and, if more than one combination of available insurers provides the benefit that meets the payment need, comparing the cost of each combination of available insurers and outputting the combination of available insurers having the lowest cost to the memory of the server.

In another aspect, the processor of the server is further configured to communicate the combination of available insurers having the lowest cost from the memory of the server to the client device. In still another aspect, the processor of the client device is configured by programming commands to display the combination of available insurers having the lowest cost to a user through the output device of the client device.

In still another aspect, the present invention includes a server processor that is further configured by programming commands to generate, for a selected range of intervals, the structured settlement plan by retrieving information related to available insurers as a function of the selected range of intervals, generating at least one combination of coverage information retrieved from the available insurers that provides a benefit that meets a payment need for each selected interval within the range of intervals, and, if more than one combination of available insurers provides the benefit that meets the payment need in each interval within the selected range of intervals, comparing the cost of each combination of available insurers and outputting the combination of available insurers having the lowest cost for each interval of the selected range of intervals, to the memory of the server.

In yet another aspect, the processor of the server is further configured to communicate the combination of available insurers having the lowest cost for each interval within the selected range of intervals from the memory of the server to the client device.

In still another aspect, the processor of the client device is configured by programming commands to display the combination of available insurers having the lowest cost for each interval within the selected range of intervals to a user through the output device of the client device.

In still another aspect, the present invention includes a method for creating customized structured settlements, comprising: providing a processor and a memory in communication with the processor, the processor configured to operate under the control of programming commands provided by specialized software programs; providing an input and output devices in communication with the processor and memory; receiving a list of desired cash payments for a selected individual and storing the list of desired cash payments and information identifying the selected individual in the memory; receiving a list of insurers providing period certain payments and information related to the period certain payment provided by each insurer of the list of insurers; storing the list of insurers providing period certain payments and the information related to the period certain payment provided by each insurer in the list of insurers in the memory; summing the desired payments for the selected individual for at least one payment period and storing the sum of the desired payments in the memory; analyzing the information related to the period certain payment provided by each insurer in the list of insurers to determine a lowest cost lump sum structured annuity for each desired cash payment; and selecting the lowest cost combination of period certain structured annuities to satisfy the desired cash payments.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings, wherein like reference numerals are employed to designate like components, are included to provide a further understanding of an annuity product management, creation, and price optimization system and method, are incorporated in and constitute a part of this specification, and illustrate embodiments of an annuity product management, creation, and price optimization system and method that together with the description serve to explain the principles of an annuity product management, creation, and price optimization system and method.

FIG. 1 shows an embodiment of information entry and option selection for an embodiment of the planning system of the present invention.

FIG. 2 shows an embodiment of viewing future medical (FMR) recommendation category information.

FIG. 3 shows an embodiment of a process for interactively managing and modifying the FMR components for each FMR category.

FIG. 4 shows an embodiment of a process for interactively adding an FMR category.

FIG. 5 shows an embodiment of a process for interactively adding an FMR component.

FIG. 10 shows an embodiment of a process for interactively selecting which insurers are to be utilized in creating a quote as well as entering rated age information, Premium Allocation Dollars, and/or Premium Allocation Percent for each insurer.

FIG. 13 illustrates an embodiment of the user information portion of a report for a structured settlement.

FIG. 14 illustrates an embodiment of a comparison analyzer of different types of optimized quotes for portion of a report for a structured settlement.

FIG. 14 illustrates an embodiment of a rate breakdown for a structure.

FIG. 15 illustrates an embodiment of a comparison between of the optimized structured settlement compared to individual insurance carrier quotes for a portion of a report for a structured settlement.

FIG. 16 illustrates an embodiment of a dynamic analyzer for comparing different types of optimized quotes for portions of a report for a structured settlement.

FIG. 21 illustrates an embodiment of a comparison for displaying the composition by insurance carrier for premium paid for the optimized structured settlement selected by the user.

DETAILED DESCRIPTION OF THE VARIOUS EMBODIMENTS

Figure 6:
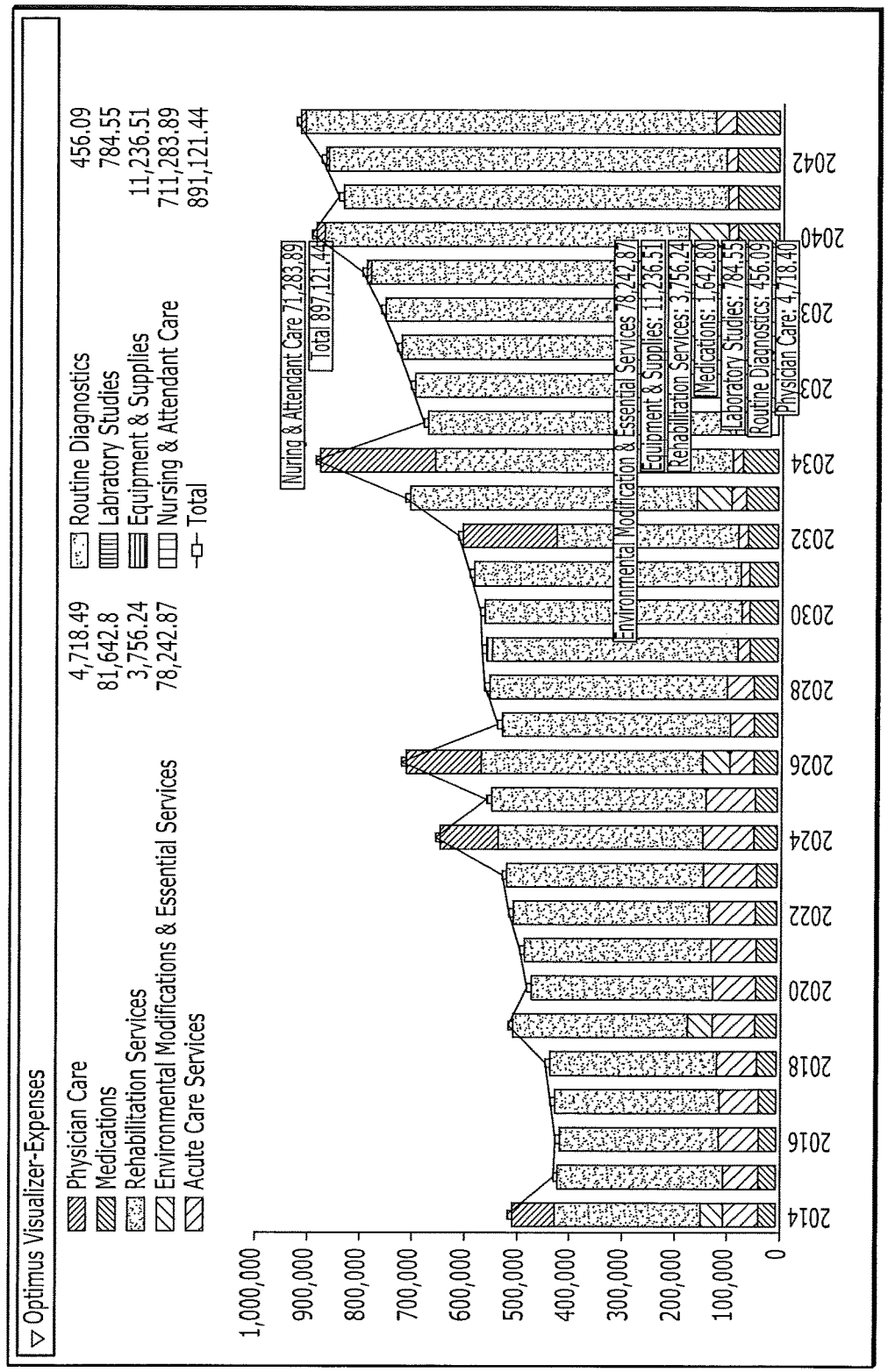
FIG. 6 shows an embodiment of a process for interactively viewing the constituent information from a Life Care Plan to create a income plan for a structured settlement.

Certain embodiments as disclosed herein provide an application framework for creating, managing, customizing, and quoting structured settlements. In one embodiment, the system comprises an application server, a database, a remote server, and a client device.

As will be described hereinafter in greater detail, the various embodiments of the present invention relate to a system and method for automating and optimizing the composition and pricing of an annuity product. For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

In the following description, numerous specific details are set forth in order to provide a thorough understanding of the present invention. It will be apparent, however, to one of ordinary skill in the art, that the present invention may be practiced without these specific details. In other instances, well known components or methods have not been described in detail but rather in a block diagram, or a schematic, in order to avoid unnecessarily obscuring the present invention. Further specific numeric references such as "first driver," may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present invention.

Throughout the description reference will be made to various software programs and hardware components that provide and carryout the features and functions of the various embodiments of the present invention. Software programs may be embedded onto a machine-readable medium. A machine-readable medium includes any mechanism that provides, stores or transmits information in a form readable by a machine, such as, for example, a computer, server or other such device. For example, a machine-readable medium includes read only memory (ROM); random access memory (RAM); magnetic disk storage media; optical storage media; flash memory devices; digital video disc (DVD); EPROMs; EEPROMs; flash memory; magnetic or optical cards; or any type of media suitable for storing electronic instructions.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or "inputting" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

In an embodiment, the logic consists of electronic circuits that follow the rules of Boolean Logic, software that contain patterns of instructions, or any combination of both.

FIG. 1 depicts an exemplary input screen or screens that are displayed to a user of an exemplary embodiment of a system and method in accordance with the present invention to provide an optimized structured annuity product. A user using a client device such as, for example, and not limited to, an iPad, Microsoft Surface, Android tablet, or desktop/laptop computer, enters information about the customer as depicted in FIG. 1. Information that may be entered by the user can include but is not limited to Name, Date of Birth, Life Expectancy, First Payment, and Type of Future Value Calculation.

Current Age is the current age for the beneficiary of the structured settlement plan. It is determined based upon the entered birth date.

In one embodiment, First Payment means the desired date for the first payment from the structured annuity. In one embodiment Type of Future Value ("FV Type") may be of two types. "Manual" and "Optimus FV". In the Manual type the user sets an inflation rate for provided goods and services called out in the Life Care Plan. Inflation rates are then applied to all goods and services in projected future required cash needs to arrive at a projected actual cash need in the future. In the Optimus FV type, predetermined inflation rates for each category/subcategory of goods and services are used to determine the future value of the goods and services specified in the Life Care Plan.

Optionally the user may automatically upload a Life Care Plan or Medicare Set-Aside. For convenience, the invention will be described in reference to a Life Care Plan. However, it will be understood that the description applies equality to a Medicare Set-Aside, or other similar plan.

FIG. 1 also depicts an exemplary screen displayed to the user to allow the user to choose and/or define various parameters or information needed for development and optimization of a Life Care Plan ("LCP"), as is shown under a tab identified as "LCP Information." Information/inputs for the LCP may be, for example, Life Care Plan Age ("LCP Age"), Life Care Plan Date ("LCP Date"), Life Expectancy ("Life Expectancy"), and Duration of Care ("Duration of Care"). LCP Age is age of the beneficiary when the Life Care Plan was created. This is specified because often the Current Age and the age at which the LCP was created are often different. LCP date is the date that the Life Care Plan was created. Duration of Care specifies for how many years the Life Care Plan applies.

Utilizing the information in the Life Care Plan, the system automatically calculates Value Expressed in the LCP by summing all the cash payments called out as necessary to provide the specified services.

Utilizing the selected Type of Future Value information, the system automatically calculates Future Value of the LCP, Future Value of Selected Structures, and Future Value of Selected Structures/Future Value of LCP. Future Value of the LCP is the future value of the entire Life Care Plan. Future Value of the LCP is calculated by utilizing the Type of Future Value parameter to adjust each time periods required cash payments for the specified inflation rate as specified in the Type of Future Value. Future Value of Selected Structures is the future value for only those components of the Life Care Plan which have been selected by the user. Future Value of Selected Structures/Future Value of LCP is a fraction of the two corresponding numbers.

In another embodiment of the invention, the system also allows the user to select whether or not to include life-contingent benefits (FIG. 1). This indicates to the system whether or not the user desires Life Certain (life-contingent) benefits to be used in planning. When this is selected, the system utilizes life-contingent benefits starting on or near the end of the cash flows specified in the Life Care Plan. This mechanism for using life-contingent benefits provides a margin of safety for the customer in the event they outlive their Life Care Plan. Furthermore, this methodology is fairly inexpensive since the start date for the payment of benefits is usually far off in the future (i.e. at or around the end of the Life Care Plan). The user may select whether to allow the system to automatically determine the start of life-contingent benefits, or whether this should be manually determined by the user. Automatically determined start to life-contingent benefits may be determined multiple ways, including starting as soon as non-life-contingent benefits end.

FIG. 2 is an exemplary display generated by the processor of the system or client system which may optionally display a summary of the Life Care Plan Future Medical Recommendation (FMR) categories from the Life Care Plan to the user. For each of the FMR categories, the user may selected the starting age at which these Life Care Plan recommended categories will start to be utilized. For example, the categories may include categories such as "physician care", "routine diagnostics", "medications", laboratory studies", "rehabilitation services", "equipment & supplies", "environmental modifications and essential services", nursing and attendant care", and "acute care services." Other categories may be added and defined as needed, as will be described in more detail below.

While the LCP specifies a start date, the user may desire to override this and select their own start date. For example, in the case of Nursing & Attendant Care, sometimes family members are planning to provide those services themselves for some period of time. However, the family members do not want to make too many assumptions about how long they will be able to provide this care. As such, rather than delete this component from the plan, they start it at a later date such that they feel comfortable that care will always be provided. Additionally, the user may select to completely delete a particular FMR component from the plan, or take only a percentage of the selected component.

FIG. 3 depicts an exemplary screen of the screen of FIG. 2 which shows detail of various categories chosen by the user. In this screen, the system optionally display to the user an expanded detail plan of FMR components for each of the FMR categories of the Life Care Plan. Information such as unit cost, frequency, and duration may be displayed along with each of these FMR components. The user may independently select what percentage of the total cost of each of these components to include. For example, the Physician Care tab has been selected by the user displaying the various types of Physician Care that may be needed to be included in the structured annuity, and it can be seen that the user has selected to include 100% of the cost of each of the physician care types. Furthermore, the user may delete each FMR component all together.

If no Life Care Plan is available for import into the system, or if the user would like to add FMR categories or components to the Life Care Plan, the user may enter in structured information about these categories, as is depicted by the exemplary screen of FIG. 4 which demonstrates an example of adding a new type of FMR category. Information that can be entered can include, but is not limited to, Name, Description, and Type. In an embodiment, the Name is free form text, the Description is free form text, and the Type is selected from a predefined list of types. Examples of types include Medicine, Equipment, and Services.

Furthermore, in the preferred embodiment the user may add FMR components to an FMR category. FIG. 5 demonstrates an example of adding a FMR component. The user may describe a name for the FMR component, such as, for example, "Neuropsychologist". Furthermore, the user may describe a start age for the usage of this component, a unit cost for the component, an inflation rate for the component, and frequency information. This frequency information may be flexibly defined using, for example, number per unit of time, such as: hour, day, week, month, or year. Additionally, the user may specify for how long this regimen should continue in hours, days, weeks, months, or years.

Additionally, in another embodiment, a user may reclassify an FMR component to a new or existing FMR category.

The system can be configured so that each time the user changes an aspect of the Life Care Plan component to be structured, values derived from the components change automatically in real time. An example would be decreasing the percentage of the Nursing & Attendant Care from 100% to 50%, and having the derived values such as Future Value of Selected Structures, and Future Value of Selected Structures/Future Value of LCP being automatically updated.

Figure 7:
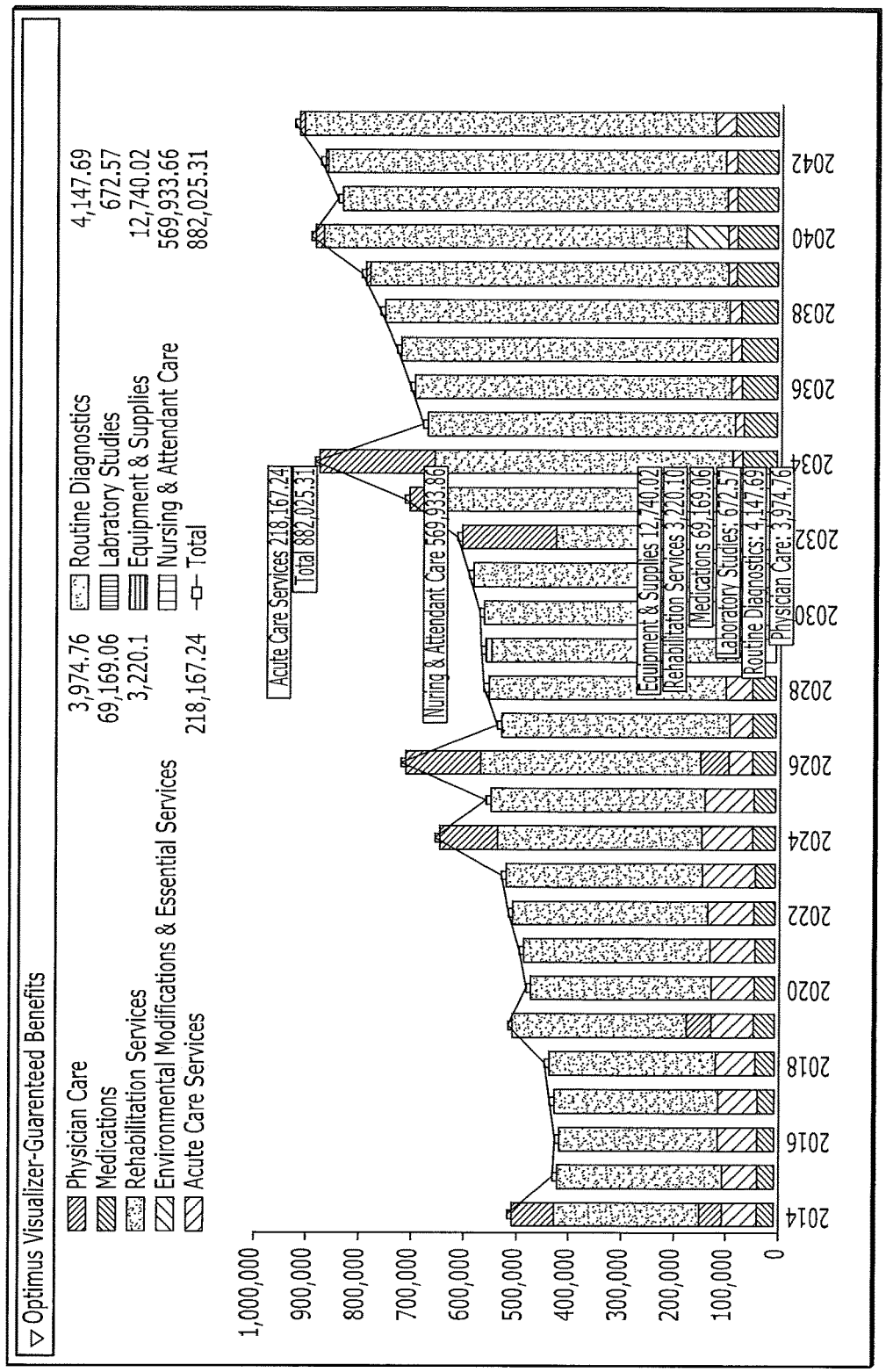
FIG. 7 shows an embodiment of a process for interactively viewing the constituent information from a Life Care Plan to create an income plan for a structured settlement with a time scale of 1 year.

Additionally, the system can optionally display a visualizer that graphically and interactively displays information about the selected Life Care Plan elements, one exemplary screen is shown in FIG. 6. For example, the visualizer may display a breakdown of constituent costs per units of time. FIG. 7 depicts an exemplary screen displaying benefits.

Figure 8:
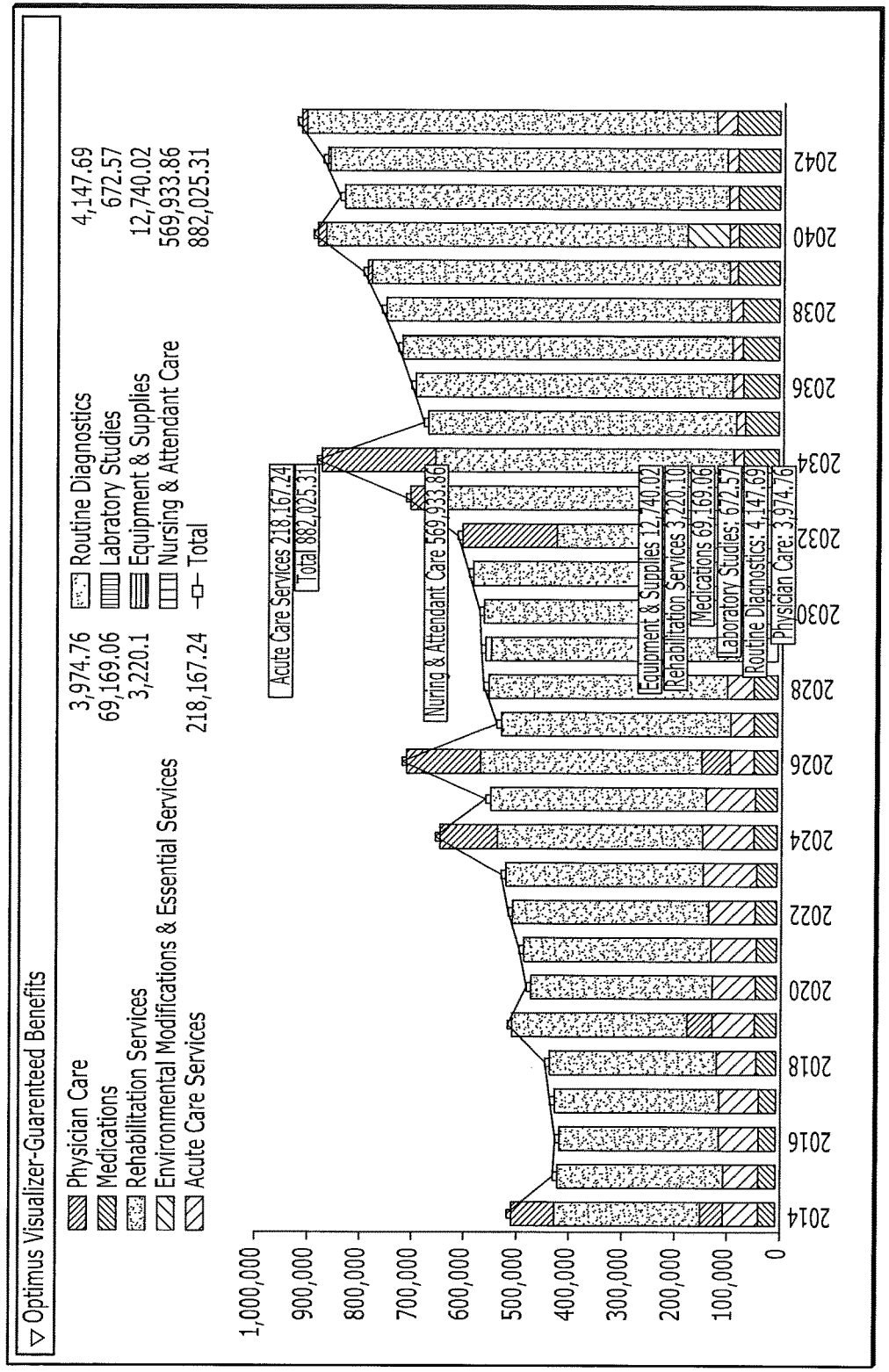
FIG. 8 shows an embodiment of a process for interactively viewing the constituent information from a Life Care Plan to create an income plan for a structured settlement with a time scale of 1 year with an element of the Life Care Plan, Nursing and Attendant Care, removed.
Figure 9:
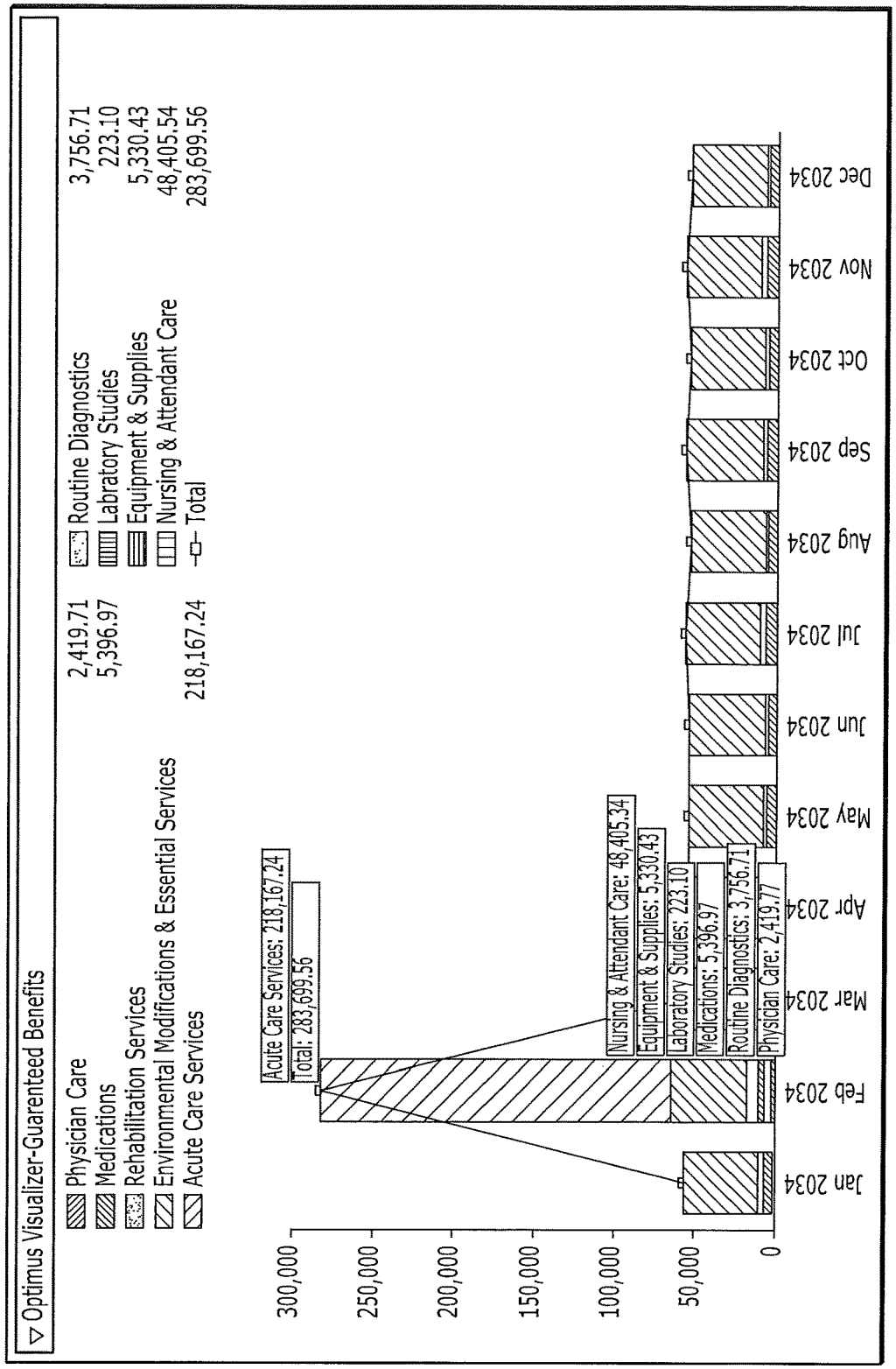
FIG. 9 shows an embodiment of a process for interactively viewing the constituent information from a Life Care Plan to create an income plan for a structured settlement with a time scale of 1 month.

In analyzing the visualizer date, the user may elect to remove a component such as Nursing & Attendant Care and visualize the breakdown of constituent costs without this component being highlighted, as shown in FIG. 8. The user may also adjust the time scale of the display so that the basic unit is a user desired amounts. In the case of FIG. 9, the time scale is a finer time scale (monthly), compared to the FIG. 7 where the time scale displays the data yearly.

Optionally, the user may select which insurers the system will use in creating the customized structure, as is shown in FIG. 10. A rated age is a number that attempts to take into account the subject's injury in estimating life expectancy. Someone who has a minor injury may have a rated age only a few years less than their actual age, whereas someone with a major injury may have a rated age a decade less than their actual age. The system provides for capture of rated age. Capture of this information allows the system to perform more granular and accurate cost searches for each insurer.

An additional feature of the embodiment allows the user to select an indication of the maximum premium allocation to each insurer, using the selection button and parameter titled "Premium Allocation". This allocation may be expressed in dollar terms, or percent terms. Premium allocation in percentage terms is defined as the maximum dollar amount of premium that will be paid to a particular insurer.

This is useful in order to limit risk of exposure to any given insurer. This allocation can also be expressed as a percentage, where the user specifies a maximum percentage of total premium that can be allocated to a particular insurer. For example, if the user indicates a 25% premium allocation to Met Life and the total premium to be paid is $100,000, then no more than $25,000 of the premium can be allocated to Met Life.

Figure 11:
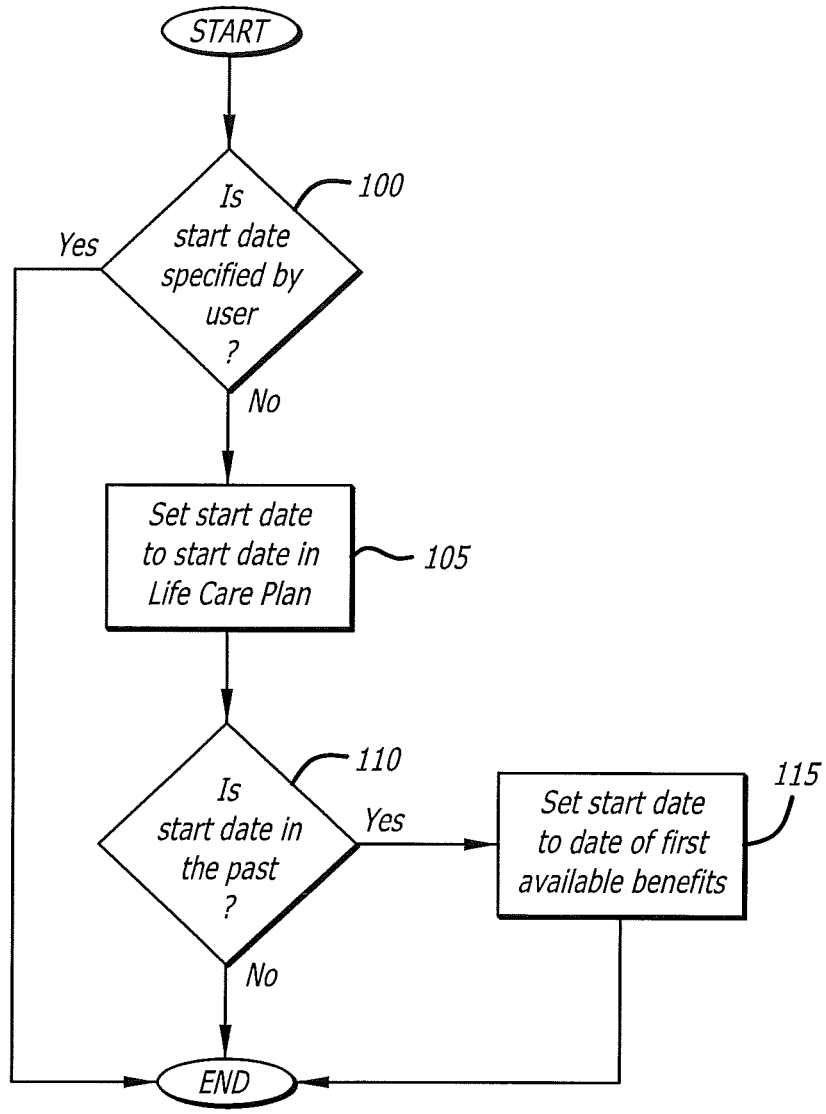
FIG. 11 illustrates an embodiment of a process for determining a start date for the structured settlement annuity.

FIG. 11 is a flow chart which illustrates the step of determining a start date for the structured settlement. In box 100, the system determines if a start date has been entered by the user. If the user has entered in a start date, then the system utilizes this start date. If no start date is defined, the system, in box 105, utilizes the start date as defined in the Life Care Plan. The system then determines if this date is in the past in box 110. If the date is in the past, the first date available for delivery of benefits with a value greater than the cost of the structure is used in box 115. The determination of the difference between cost and value can be determined a number of ways as known in the art.

Figure 12:
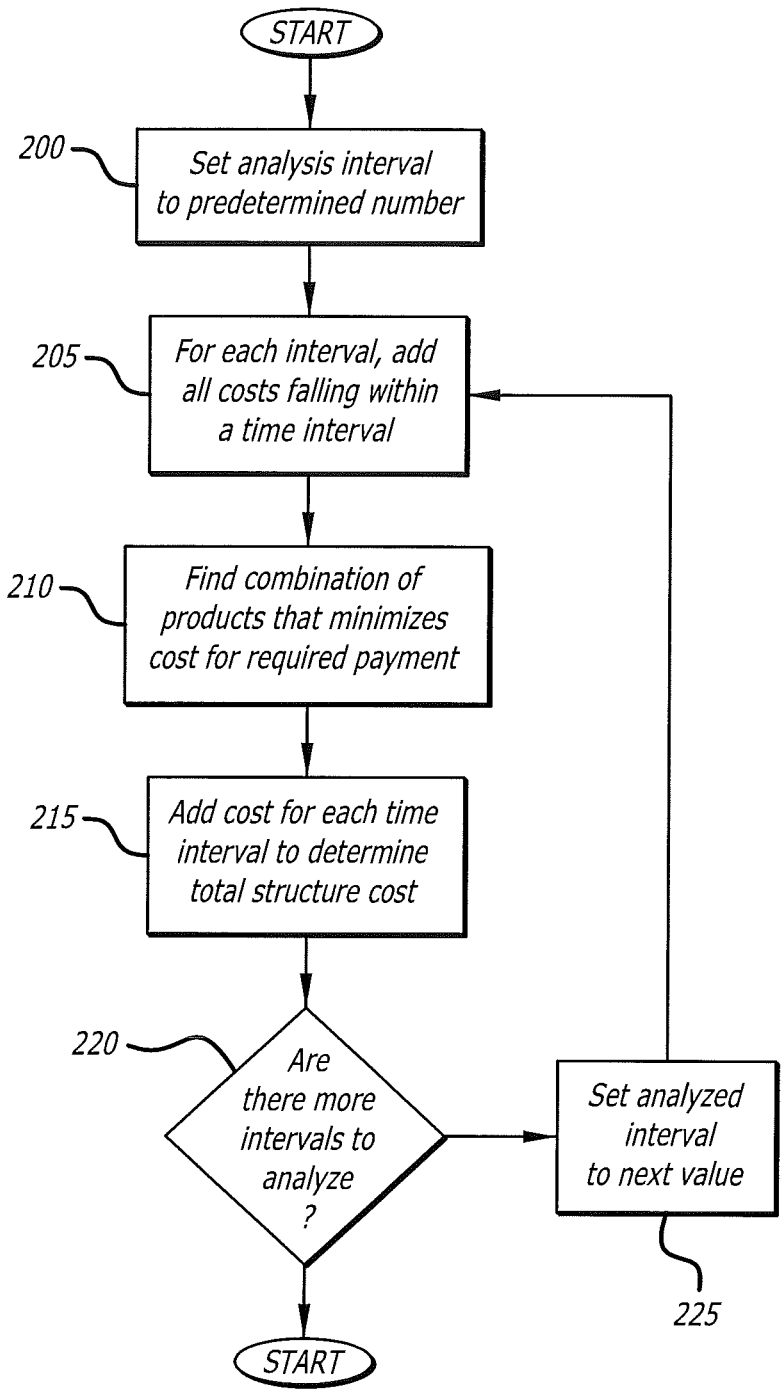
FIG. 12 illustrates an embodiment of a process for determining optimum product pricing of a structured annuity.

FIG. 12 is a flow chart illustrating an embodiment of the invention that includes a multistep price optimization process. In box 200, the system sets an analysis time interval ("analysis interval") for price analysis based upon a predetermined selection from a list of possible intervals. For example, a first interval may be a yearly interval. In box 205, the processor of the system adds up, for each interval, all costs falling within that time interval. In the example where a yearly analysis interval is selected, the first yearly interval may be, for example, the year 2012 and have a cost of $78,000, year 2013 may be $18,000, year 2014 may be $13,000, and so on.

In box 210, the processor will retrieve information defining various products and/or combinations of products and their costs, compare the costs of each and determine the minimize costs and identify the product or combination of products that produced this minimized cost, this total sum for each year will then be optimized for the lowest cost product or combination of products that produce the desired sum for the interval. In one embodiment, this optimization is performed by exhaustively searching all possible combinations. For example, year 2012 requires $78,000 of costs to be covered. After searching all combinations of annuities, the system may determine that that period may be covered by receiving $5,000 from Pacific Life and a lump sum of $72,000 from New York Life is the combination that produce the required benefit for the lowest cost. The interval of year 2013 requires $18,000 in benefits. In this interval, the system may determine that interval is optimally satisfied using a $5,000 period certain annuity from Pacific Life and a lump sum of $13,000 from Prudential. Many other methods of searching for this optimization are possible in order to optimize pricing for this defined problem, and they may also be used.

In box 215, the costs for the optimized products for each time interval are summed to give a total structure cost. In box 220, the system determines if there is a next analysis interval to analyze from the predetermined list. If there is another interval, the next analysis interval is assigned in box 225 and the process returns to box 105 and is repeated. If there are no further intervals to be optimized, as determined in box 220, the total structure cost for all analyzed intervals is compared, and the analysis interval with the lowest total structure cost has been determined and the process ends.

This optimization process may be run with different constraints to produce different types of targeted, optimized structured settlements quotes. Referring now to FIG. 13, the results of the optimizing processor may be displayed to the user. For example, a single time interval, such as a month, may be selected. This type is called "Select" in the example, whereas the multiple time interval option is called "Select Plus." Another type of constraint may be determining that only Lump Sum annuities can be used in the process. A further constraint may be limiting the types of annuities used to being only Period Certain.

In FIG. 12, the system displays to the user information about the client for whom the structured settlement is being quoted. This information can include name, date of birth, date of first payment, Life Care Plan age, current age, sex, life expectancy, duration of care, and type of future value calculation.

Part of this report may also include an analyzer which compares different types of optimized structured settlements, such as that shown in FIG. 14. In this embodiment, and for comparison purposes, the system displays the results of Select and Select Plus structured settlements determined by the system along with structured settlements created by using only lump sum type annuities, and another using only period certain annuities. It will be understood by those skilled in the art that the comparison can be to any number of predefined types of structured settlement products with different configurations for such factors as time interval size. In yet another embodiment of the invention, the user may command the system to display information about the combination of annuities for each quote, such as is displayed in FIG. 15.

FIG. 16 is an exemplary display of a comparison of structured settlements created using only individual carriers. For example, individual carriers may include Pacific Life, New York Life, MetLife, and Prudential. Structured settlements created by constraining selections to only these carriers demonstrate the efficiency gained by allowing the system to pick and choose between different earners.

Figure 17:
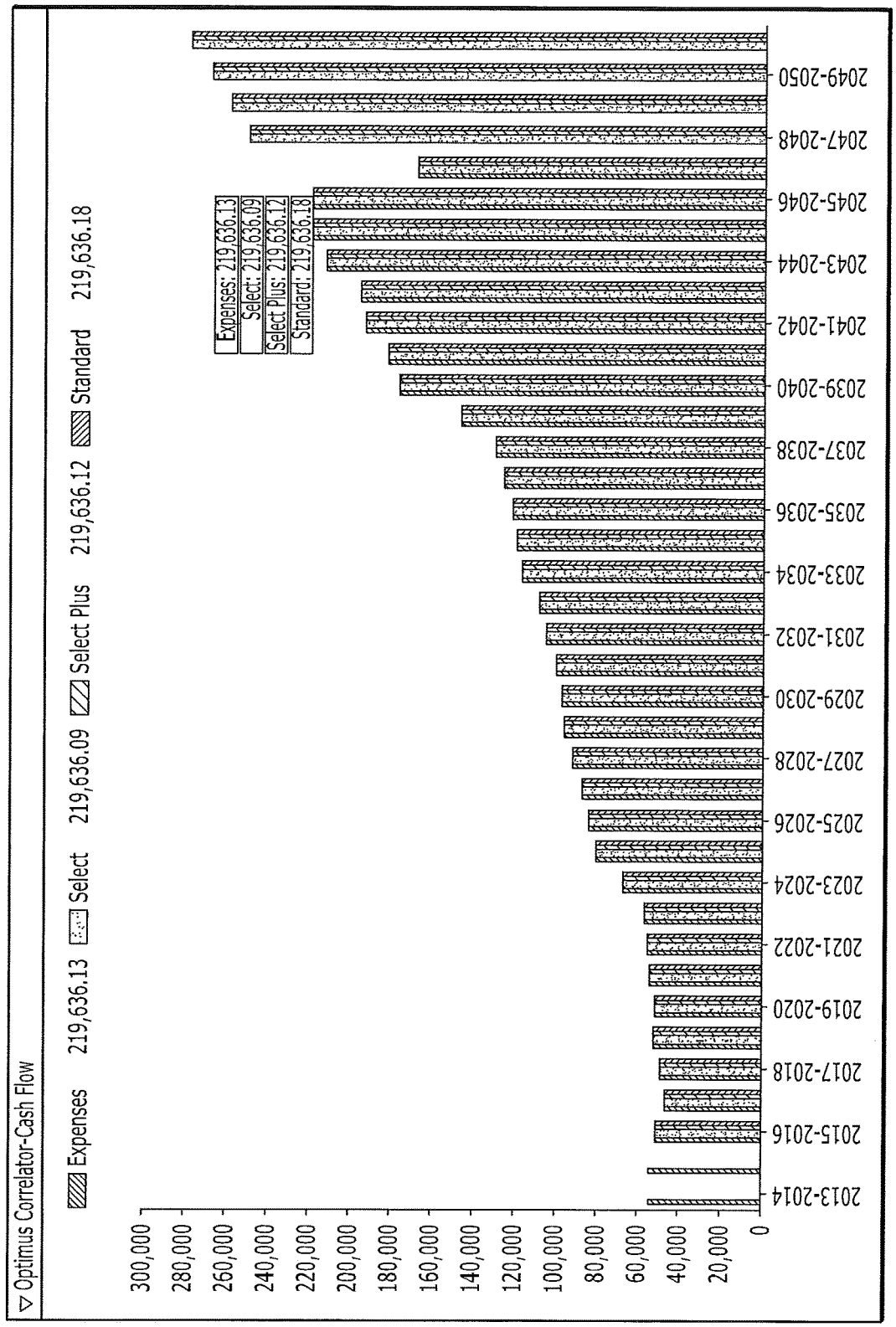
FIG. 17 illustrates an embodiment of a graphical comparison for displaying the correlation between different optimized quotes and cash flows required by the expenses to be incurred in a Life Care Plan with a time scale set to yearly.

In yet another embodiment, the system software programming that control the processor to display a dynamic visualizer to the user. FIG. 17 is an exemplary display of such a dynamic visualizer. The dynamic visualizer provides functionality which allows the user to specify time intervals to view comparisons of the analyzer. For example, the user may specify decade long intervals such as is displayed in FIG. 17. When the user selects one of the decade intervals, the system numerically displays the amount of monies provided by each annuity type along with the projected expenses required by the Life Care Plan.

Figure 18:
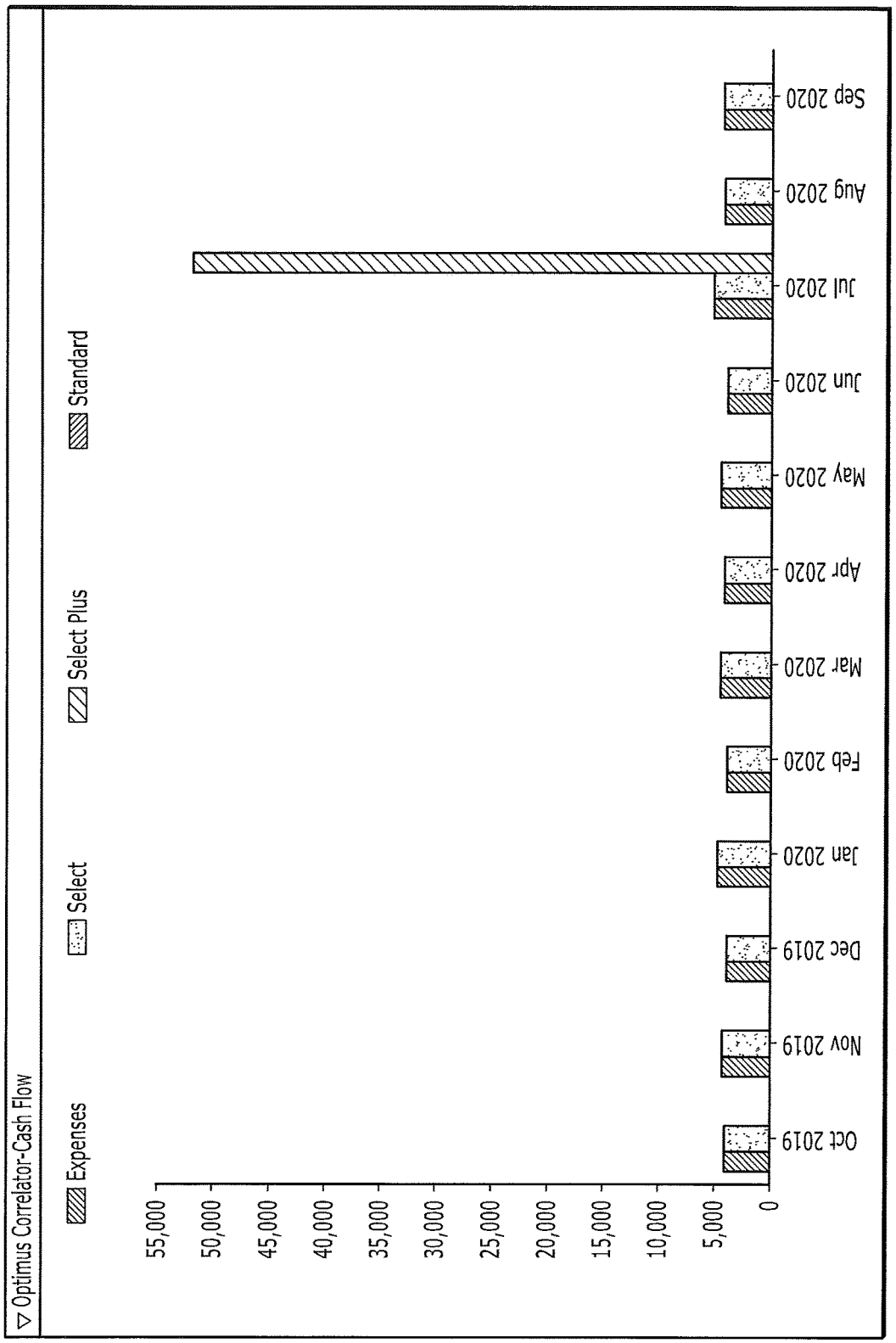
FIG. 18 illustrates an embodiment of a graphical comparison for displaying the correlation between different optimized quotes and cash flows required by the expenses to be incurred in a Life Care Plan with a time scale set to monthly.

Additionally, the time scale of this dynamic visualizer may be adjusted to a user-desired scale. For example, FIG. 18 demonstrates the effect of changing the yearly scale in FIG. 17 to a monthly scale.

Figure 19:
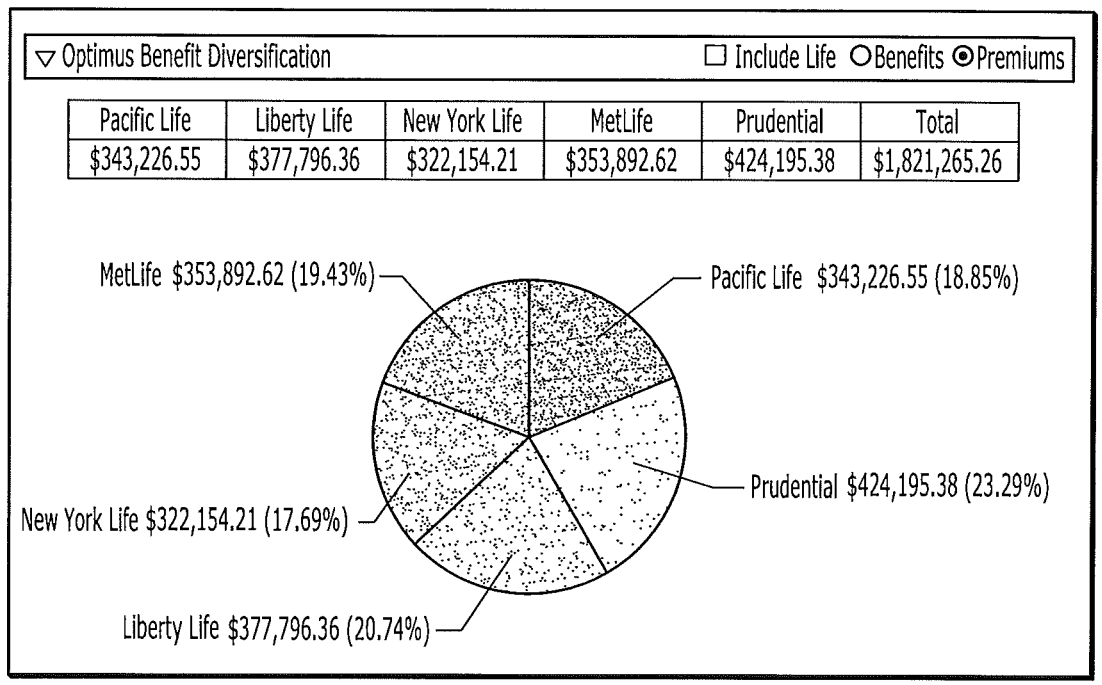
FIG. 19 illustrates an embodiment of a graphical comparison for displaying the composition by insurance carrier for premium paid for the optimized structured settlement selected by the user.
Figure 20:
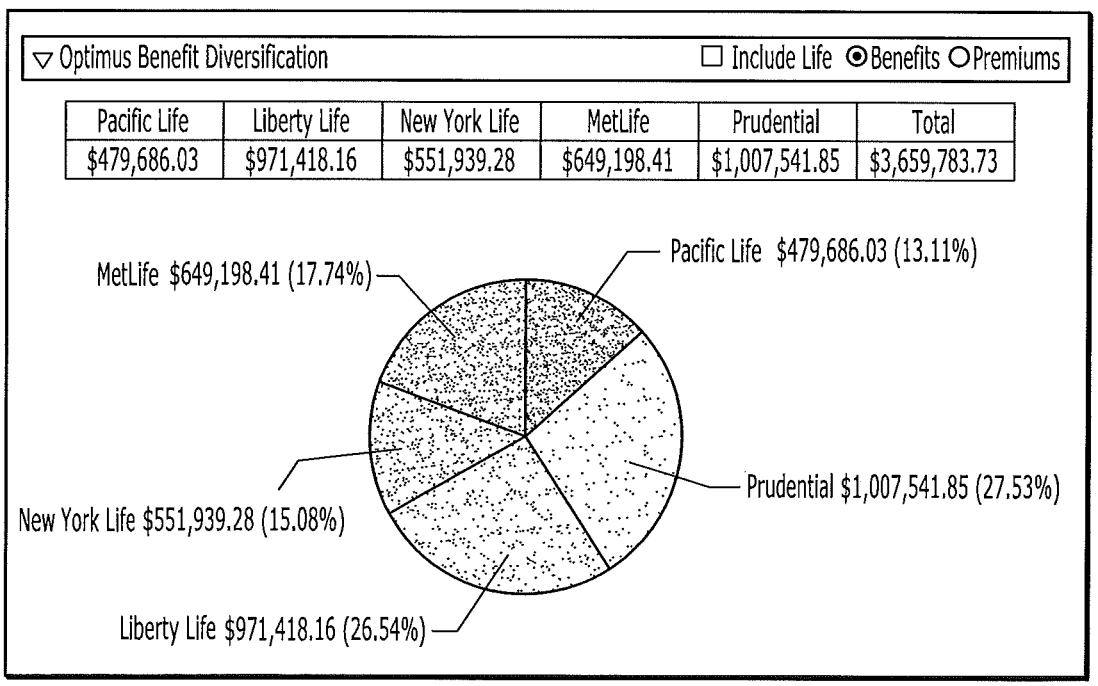
FIG. 20 illustrates an embodiment of a graphical comparison for displaying the composition by insurance carrier for benefits paid for the optimized structured settlement selected by the user.

In yet another embodiment of the invention, depicted in FIG. 19, the system may display to the user a comparison graphic, displaying the composition by earner, of the optimized structured settlement broken out by amount of premium paid to each carrier. Alternatively, or additionally, the system may create a display as in FIG. 20 based upon the amount of benefits to be paid out by each carrier.

The user may select the type of optimized structured settlement type which will used to display. For example, the types may be "Select", "Select Plus", and "Standard". Furthermore, for the selected structured settlement type, as illustrated in FIG. 21, the system may also by commanded to display to the user a consolidated view of benefit amount per insurer, premium allocation by percentage, and premium allocation by dollar amount. The amount of life-contingent premium paid to each insurer may also be displayed if life-contingent premium is part of the structure.

In yet another aspect of the invention, the system may be commanded to display to the user information relating to how well the payments of a particular structured settlement quote correlate with the anticipated medical expenses, as defined in the Life Care Plan. This comparison may be done in a variety of ways.

Figure 22:
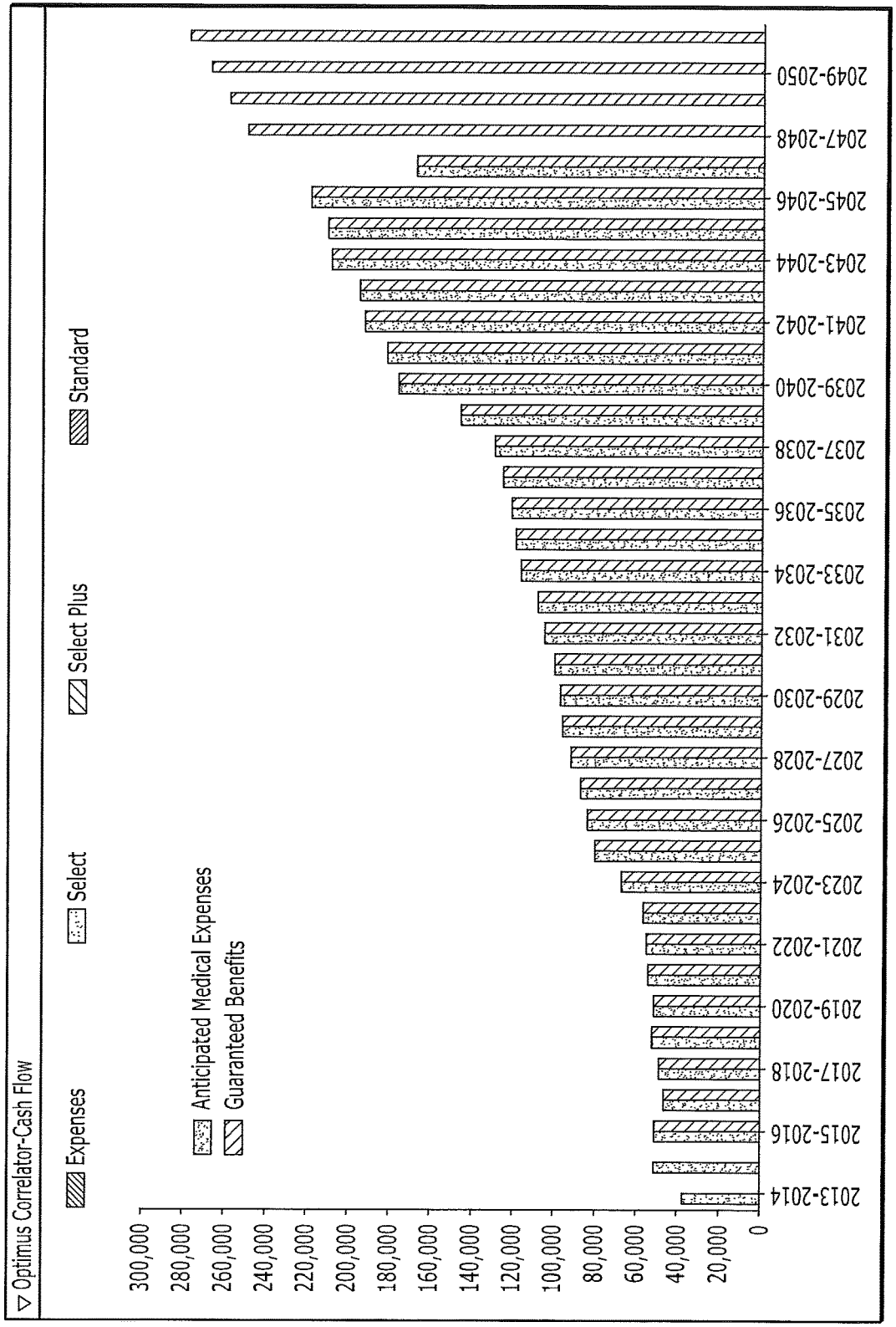
FIG. 22 illustrates an embodiment of a graphical comparison for displaying the correlation of guaranteed benefits to anticipated medical expenses.

In one embodiment a graphical display, as in FIG. 22, may be created and displayed to the user. This graphic displays information allowing one to see, at selected intervals, how much monies are required for anticipated medical expenses, and how much monies are to be paid in the form of guaranteed benefits. An example of a particular time interval may be monthly (FIG. 18), quarterly, yearly (FIG. 17), 3 years (as in FIG. 22), 5 years, 10 years, and the like. This time interval may be adjusted by the user so that user may interactively perform the comparison.

Furthermore, the system may calculate a numerical representation of the correlation of how the benefits or a plan match up to the cost of the plan. An example of such a numerical comparison that may be calculated is the Pearson Product Moment Correlation Coefficient illustrated by the algorithm displayed in FIG. 23 where:

n=number of months in the Life Care Plan, $x_i$=amount of money required at month i, $y_i$=amount of money to be paid out in guaranteed benefits at month i, $\bar{x}$=mean value for amount of money required for all months, and $\bar{y}$=mean value for the amount of money to be paid out in guaranteed benefits for all months.

The correlation coefficient determined by the process provides the user with an indication of how close to a benefit needed in a certain interval correlates with the costs estimated for that interval. In this way the user may determine if the optimized plan provides the benefit that is sought, and if the correlation is too low, the user may adjust the inputs to the system to improve the con-elation so that benefit needed is provided in an identified interval at an acceptable cost.

Figures 23, 24:
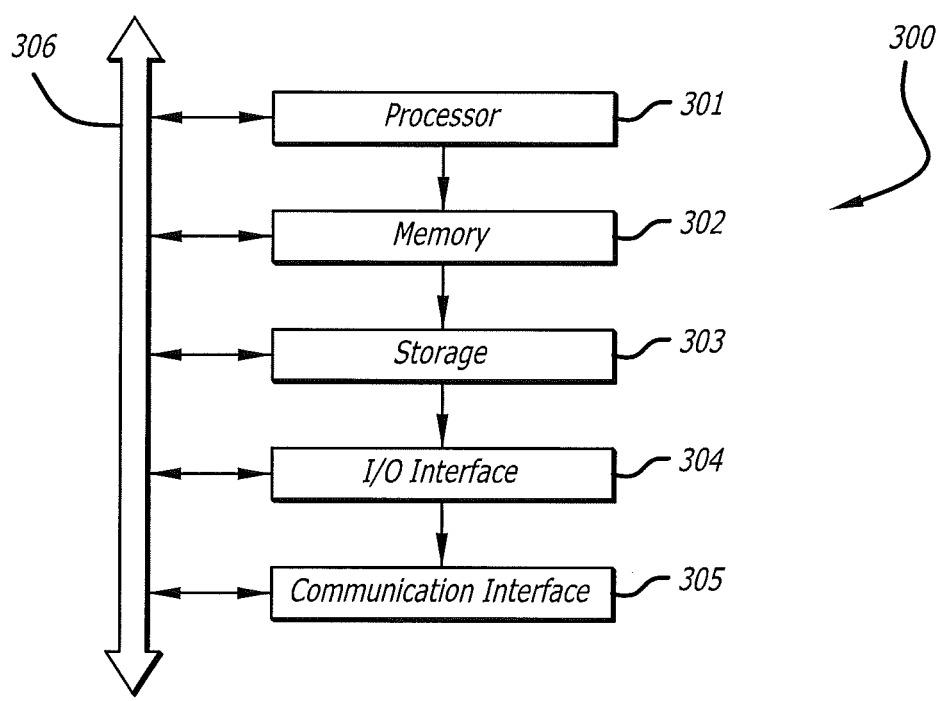
FIG. 23 illustrates an embodiment of a graphical comparison for displaying the correlation of guaranteed benefits to anticipated medical expenses.
FIG. 24 is a graphic description of a graphical representation of representative components and processes of a server system used to carry out various processes of the present invention.

FIG. 24 illustrates an exemplary computer system 300 which may be used with some embodiments of the present invention, which may be, for example, a server or a client computer system. Computer system 300 may take any suitable form, including but not limited to, an embedded computer system, a system-on-chip (SOC), a single-board computer system (SBC) (such as, for example, a computer-on-module (COM) or system-on-module (SOM)), a laptop or notebook computer system, a smart phone, a personal digital assistant (PDA), a server, a tablet computer system, a kiosk, a terminal, a mainframe, a mesh of computer systems, etc. Computer system 300 may be a combination of multiple forms. Computer system 500 may include one or more computer systems 300, be unitary or distributed, span multiple locations, span multiple systems, or reside in a cloud (which may include one or more cloud components in one or more networks).

In one embodiment, computer system 300 may include one or more processors 301, memory 302, storage 303, an input/output (I/O) interface 304, a communication interface 305, and a bus 306, Although this disclosure describes and illustrates a particular computer system having a particular number of particular components in a particular arrangement, this disclosure contemplates other forms of computer systems having any suitable number of components in any suitable arrangement.

In one embodiment, processor 301 includes hardware for executing instructions, such as those making up software. Herein, reference to software may encompass one or more applications, byte code, one or more computer programs, one or more executable module or API, one or more instructions, logic, machine code, one or more scripts, or source code, and or the like, where appropriate. As an example and not by way of limitation, to execute instructions, processor 301 may retrieve the instructions from an internal register, an internal cache, memory 302 or storage 303; decode and execute them; and then write one or more results to an internal register, an internal cache, memory 302, or storage 303. In one embodiment, processor 301 may include one or more internal caches for data, instructions, or addresses. Memory 303 may be random access memory (RAM), static RAM, dynamic RAM or any other suitable memory. Storage 305 may be a hard drive, a floppy disk drive, flash memory, an optical disk, magnetic tape, or any other form of storage device that can store data (including instructions for execution by a processor).

In one embodiment, storage 303 may be mass storage for data or instructions which may include, but not limited to, a HDD, solid state drive, disk drive, flash memory, optical disc (such as a DVD, CD, Blu-ray, and the like), magneto optical disc, magnetic tape, or any other hardware device which stores computer readable media, data and/or combinations thereof. Storage 303 maybe be internal or external to computer system 300.

In one embodiment, input/output (I/O) interface 304 includes hardware, software, or both for providing one or more interfaces for communication between computer system 300 and one or more I/O devices. Computer system 300 may have one or more of these I/O devices, where appropriate. As an example but not by way of limitation, an I/O device may include one or more mouses, keyboards, keypads, cameras, microphones, monitors, displays, printers, scanners, speakers, cameras, touch screens, trackball, trackpad, biometric input device or sensor, or the like.

In still another embodiment, a communication interface 305 includes hardware, software, or both providing one or more interfaces for communication between one or more computer systems or one or more networks. Communication interface 305 may include a network interface controller (NIC) or a network adapter for communicating with an Ethernet or other wired-based network or a wireless NIC or wireless adapter for communications with a wireless network, such as a Wi-Fi network. In one embodiment, bus 306 includes any hardware, software, or both, coupling components of a computer system 300 to each other.

Figure 25:
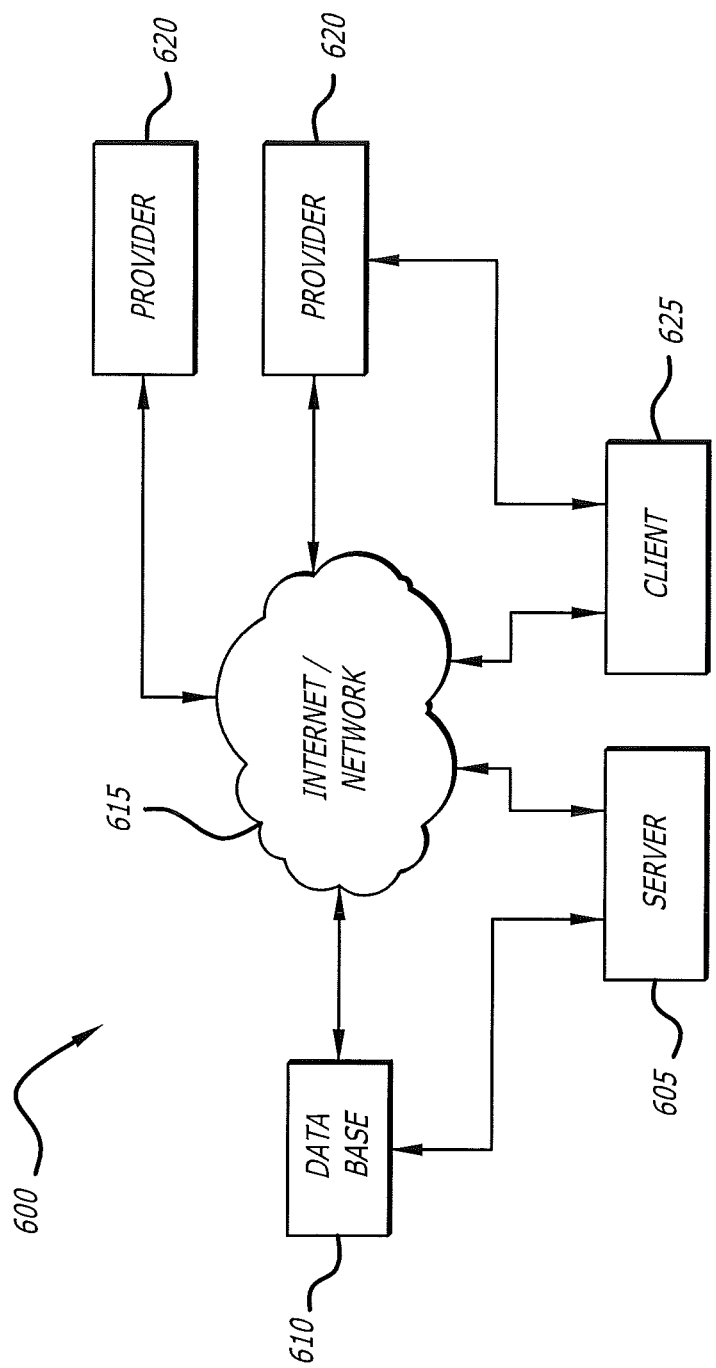
FIG. 25 is a graphical representation of a system incorporating various embodiments of the present invention that depicts the various computers, terminals, servers and networks on which the various embodiments of the present invention are carried out.

FIG. 25 is a graphical representation of an exemplary network 600 that may be used to facilitate the various embodiments of the present invention. Server 605 is operated by a structured settlement services organization, and typically includes at least one processor, input and output equipment or devices, memory, storage, and a communication interface as discussed above with regards to FIG. 24. The server also operates under the control of specialized software programming commands that are designed to carry out the various processes described above. It should be understood that while the exemplary network 600 is described in terms of a server operated by a structured settlement services organization, the server could be operated by a third party hired by the structured settlement services organization or under the control of the structured settlement services organization. The server could also be operated by a third party independent of the structured settlement services organization, which then provides information and/or data to the structured settlement services organization from which the structured settlement services organization may provide services to a client of the structured settlement services organization.

A data storage device 610, which may be separate from the server, but not necessarily, may be accessible to the server 605, and may be used for storing date related to information and any other data related to operation of the various embodiments of the system and method described above. The data storage device 610 may directly connected to the server, or it may be accessible to the server through a network or the Internet, The data storage device may also be a virtual storage device or memory located in the Cloud. Data that may be stored on data storage device 610 includes, but is not limited to Life Care Plans, Medicare Set Asides, Loss of Earnings Assessments, and/or other types of damages models, quotes for financial products, as well as structured settlement quoting options and any other information that may be related to or useful for creating and maintaining structured settlement plans.

Server 605 may communicate with a network 615, which may be, for example, a local area network (LAN) or a wide area network (WAN) or the Internet and the World Wide Web. The server may communicate through the network 615 with Providers 620, such as, for example, Met-Life, Pacific Life, New Your Life, and the like. The server may also communicate with user of the system through client device 625. Client device(s) will include processors and other ancillary equipment as described above with reference to FIG. 6.

Those skilled in the art will understand that the connections between server 605, data storage 610, network 615, Provider 620 and client device 625 may be hard wired, or they may be wireless. As stated above, client device 625 may be any device capable of operably connecting the network and accessing a web page or account hosted by server 605.

While particular embodiments of the present invention have been described, it is understood that various different modifications within the scope and spirit of the invention are possible. The invention is limited only by the scope of the appended claims.

We claim:

1. A computer-implemented system comprising one or more processors configured to:
receive information related to a person for whom a structured settlement product is being quoted, the information associated with at least one of a selected future value calculation method, a selected duration of care, inclusion of life-contingent benefits, a start date for delivery of the life-contingent benefits, and a source location of a care plan,
a graphical user interface being provided to a user displaying options for choosing from a plurality of life care plan categories and at least a first starting age associated with a first category out of the plurality of life care plan categories, such that in response to selecting the first life care plan category and the first starting age, the user is further provided with options to select at least one of a frequency, cost and inflation rate associated with the first life care plan, wherein depending on the user selection of the provided options, a dynamic visualizer updates a graphical display in real time to display changes in values and breakdown costs associated with the user's selection of one or more of the plurality of life care plan categories,
the dynamic visualizer providing functionality to allow the user to specify time intervals that may be adjusted according to duration to show user-desired time scale with projected expenses required by the first life care plan during various time intervals, such that the user can view the projected expense in more than one time scale for comparison,
user interaction with the dynamic visualizer allowing the user to switch from a first time scale to a second time scale without need for starting over;
receive an input setting a beginning date and an ending date for a structured settlement plan;
determine a set of analysis intervals with the beginning date and the ending date, the duration of an analysis interval being based upon a payout date of a previously determined benefit payout schedule, the analysis interval duration being the same, or variable, from one of the intervals of the set of analysis intervals to a previous or next interval;
retrieve information related to the damages valuation models, such that for the analysis interval, cost information and benefit payout information for one or more valuation models and financial products quotes and customized structured settlement quotes and constructions that occur during the analysis interval are obtained and sum of the extracted cost information and payout information is calculated;
for an interval in the set of analysis intervals, optimize a payout benefit for the interval by analyzing the extracted cost information and benefit payout information of one or more financial products for the interval that satisfies the cash flow benefit need for the interval;
calculate a correlation of a cost and the cash flow of the one or more financial products determined in one or more analysis intervals, using an algorithm for calculating a Pearson Product Moment Correlation Coefficient for the analyzed interval;
if the calculated correlation is not satisfactory for the interval, select a different financial product or products from the one or more financial products and repeat the optimizing and the calculating for the interval until the calculated correlation for the interval is satisfactory;
increment the analysis interval to a next interval, in response to determining that the next interval has not been analyzed;
in response to determining that the next interval has been analyzed, sum the determined extracted cost of the determined one or more financial products providing a cash flow benefit satisfying the cash flow benefit of each interval to provide a total cost of the structured settlement plan; and
based on the calculated correlation and the total cost of the structured settlement plan, generate an optimized structured settlement plan.

2. The system of claim 1, wherein information related to available care plan category are retrieved and the available care plan category is displayed to the user.

3. The system of claim 2, wherein the information related to available care plan category includes services within a category.

4. The system of claim 1, wherein the generated structured settlement plan includes total care plan costs for a predetermined time interval.

5. The system of claim 4, wherein the generated structured settlement plan includes constituent costs for the predetermined time interval.

6. The system of claim 4, wherein the predetermined time interval may be changed by the user to display updated total care plan costs.

7. The system of claim 1, wherein the structured settlement plan is generated by retrieving information related to available insurers, generating at least one combination of coverage information retrieved from the available insurers that provides a benefit that meets a payment need for a selected interval, and if more than one combination of available insurers provides the benefit that meets the payment need, comparing the cost of one or more combinations of available insurers and outputting the combination of available insurers having a lowest cost.

8. The system of claim 7, wherein the combination of available insurers having the lowest cost is communicated to a client device.

9. The system of claim 8, wherein the combination of available insurers having the lowest cost is displayed to a user through an output device of the client device.

10. The system of claim 1, wherein for a selected range of intervals, the structured settlement plan is generated by retrieving information related to available insurers as a function of the selected range of intervals, at least one combination of coverage information retrieved from the available insurers being generated that provides a benefit that meets a payment need for each selected interval within the range of intervals, and if more than one combination of available insurers provides the benefit that meets the payment need in each interval within the selected range of intervals, comparing the cost of one or more combination of available insurers and outputting the combination of available insurers having a lowest cost for each interval of the selected range of intervals to the server.

11. The system of claim 10, wherein the combination of available insurers having the lowest cost for each interval within the selected range of intervals is communicated from the server to a client device.

12. The system of claim 11, wherein the combination of available insurers having the lowest cost for each interval within the selected range of intervals is displayed to a user through an output device of the client device.

13. A computer-implemented method which when executed on a computer causes one or more computer processors to:

receive information related to a structured settlement product, the information including at least one of a future value calculation method, a duration of care, life care benefits, a start date for delivery of the life care benefits, and a source location of a life care plan;

display on a graphical user interface provided to a user options for choosing from a plurality of life care plan categories and at least a first starting age associated with a first category out of the plurality of life care plan categories, such that in response to selecting the first life care plan category and the first starting age, the user is further provided with options to select at least one of a frequency, cost, and inflation rate associated with the first life care plan, wherein depending on the user selection of the provided options, a dynamic visualizer updates a graphical display in real time to display changes in values and breakdown costs associated with the user's selection of one or more of the plurality of life care plan categories, the dynamic visualizer providing functionality to allow the user to specify time intervals that may be adjusted according to duration to show user-desired time scale, user interaction with the dynamic visualizer allowing the user to switch from a first time scale to a second time scale;

receive an input setting a beginning date and an ending date for a structured settlement plan;

determine a set of analysis intervals with the beginning date and the ending date, the duration of an analysis interval being based upon a payout date of a previously determined benefit payout schedule, the interval duration being the same, or variable, from one of the intervals of the set of analysis intervals to a previous or next interval;

retrieve information related to the damages valuation models, such that for the analysis interval, cost information and benefit payout information for one or more valuation models and financial products quotes and customized structured settlement quotes and constructions that occur during the interval are obtained and sum of the extracted cost information and payout information is calculated;

optimize a payout benefit for the interval by analyzing the extracted cost information and benefit payout information of one or more financial products for the interval that satisfies the cash flow benefit need for the interval;

calculate a correlation of a cost and the cash flow of the one or more financial products determined in an analysis interval;

select a different financial product or products from the one or more financial products;

increment the analysis interval to a next interval, in response to determining that the next interval has not been analyzed;

analyze the next interval and, once the next interval has been analyzed, sum the determined extracted cost of the determined one or more financial products providing a cash flow benefit satisfying the cash flow benefit of each interval to provide a total cost of the structured settlement plan; and based on the calculated correlation and the total cost of the structured settlement plan, generate an optimized structured settlement plan.

14. The method of claim 13, wherein information related to available care plan category are retrieved and display the available care plan category to a user.

15. The method of claim 14, wherein the information related to available care plan category includes services within a category.

16. The method of claim 13, wherein the generated structured settlement plan includes total care plan costs for a predetermined time interval.

17. The method of claim 16, wherein the generated structured settlement plan includes constituent costs for the predetermined time interval.

18. The method of claim 16, wherein the predetermined time interval may be changed by the user to display updated total care plan costs.

19. The method of claim 13, wherein the structured settlement plan is generated by retrieving information related to available insurers, at least one combination of coverage information retrieved from the available insurers being generated that provides a benefit that meets a payment need for a selected interval, and if more than one combination of available insurers provides the benefit that meets the payment need, the cost of each combination of available insurers is compared and the combination of available insurers having a lowest cost is forwarded to the server.

\* \* \* \* \*